(12) United States Patent
Takahashi et al.

(10) Patent No.: US 8,582,408 B2
(45) Date of Patent: Nov. 12, 2013

(54) OPTICAL READ/WRITE APPARATUS

(75) Inventors: Yuichi Takahashi, Nara (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/534,344

(22) Filed: Jun. 27, 2012

(65) Prior Publication Data

US 2013/0083640 A1   Apr. 4, 2013

(30) Foreign Application Priority Data

Oct. 3, 2011   (JP) .................................. 2011-219014

(51) Int. Cl.
*G11B 7/125*   (2012.01)
(52) U.S. Cl.
USPC ........................................ 369/53.26; 369/116
(58) Field of Classification Search
None
See application file for complete search history.

(56) References Cited

U.S. PATENT DOCUMENTS

| | | | |
|---|---|---|---|
| 4,935,913 A | | 6/1990 | Shinoda |
| 5,450,390 A | * | 9/1995 | Toda et al. ..................... 369/121 |
| 5,627,813 A | | 5/1997 | Miyashita |
| 7,057,990 B1 | | 6/2006 | Seo |

FOREIGN PATENT DOCUMENTS

| | | |
|---|---|---|
| JP | 59-113509 A | 6/1984 |
| JP | 63-249941 A | 10/1988 |
| JP | 63-304436 A | 12/1988 |
| JP | 61-261828 A | 11/1996 |

\* cited by examiner

*Primary Examiner* — Wayne Young
*Assistant Examiner* — Brian Butcher
(74) *Attorney, Agent, or Firm* — Renner, Otto, Boisselle & Sklar, LLP

(57) ABSTRACT

Disclosed is an improved DRAW technique for writing data on an optical storage medium and reading the data in parallel. In obtaining the optical power of a first light source 1, writing user data is temporarily suspended to write non-user data with a second light source 2 turned OFF.

21 Claims, 27 Drawing Sheets

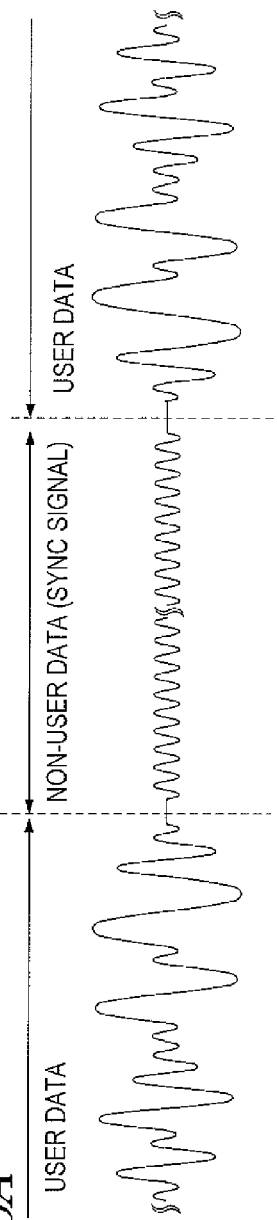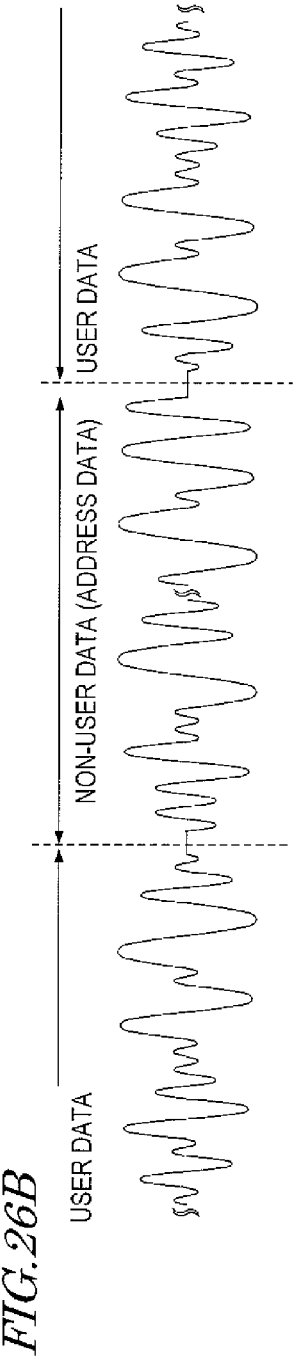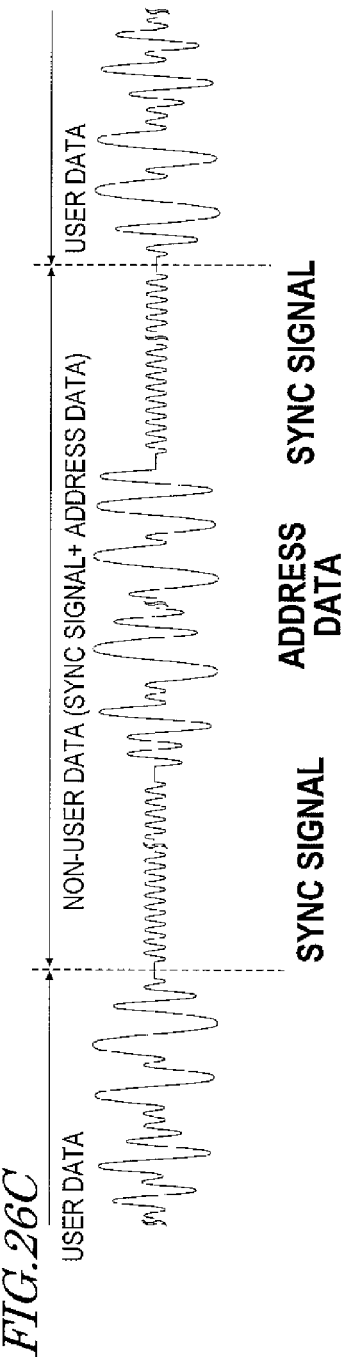

RECORDING TRACK
(LAND PORTION)

OPTICAL READ/WRITE APPARATUS

BACKGROUND OF THE DISCLOSURE

1. Field of the Invention

The present disclosure relates to an optical read/write apparatus that reads, writes or erases information from/on an optical storage medium such as an optical tape, an optical disc or an optical card. More particularly, the present disclosure relates to an apparatus that carries out verification on signal marks being recorded on an optical storage medium while writing data on it.

2. Description of the Related Art

Recently, the size of digital data to process has been rising steeply year by year as the resolutions of video data and still picture data have been tremendously increased and as increasing numbers of paper media have been converted into electronic ones. Meanwhile, so-called "crowd computing" technologies that allow people to use various kinds of applications and services via servers and storage systems on some network have become more and more popular nowadays. According to such crowd computing technologies, as a huge number of users save various kinds of data on that storage system on the network, the amount of data accumulated there should keep on skyrocketing from now on.

In the meantime, as regulations have been established one after another with regard to the duty of preserving such a huge amount of data saved, it should also be increasingly important to devise a method for saving that enormous amount of data as securely and as reliably as possible. An apparatus that writes data of such a huge size optically on a storage medium can perform the operation of seeing if (signal) marks have been recorded just as intended on the optical storage medium in order to increase the reliability of writing. Such an operation will be referred to herein as a "verify operation".

A known apparatus that performs a read/write operation on a write-once or rewritable storage medium such as an optical disc reads data that has been just written and compares the data that has been read to the data to write in order to detect an error, if any, lest the write operation should fail due to a defect on the storage medium.

Such a verify operation is often performed in a unit at which a constant write or transfer rate can be maintained, not after everything has been written. That is to say, every time the disc has turned to a predetermined degree, the write operation is suspended, a track jump is made to return to the previous location, that portion on which data has just been written is scanned to detect any error, and then a track jump is made once again to move to a different area and write the next data there. And this series of operations is carried out over and over again. That is why although reliability can be certainly ensured in this way for the data that has been written, it takes a longer time to get the write operation done.

If any error is detected when the data that has just been written is read, then the write operation is retried on another area, not the area on which the write error has occurred. On an optical disc, a set of data and its ID information are stored on the basis of a unit area called a "sector". Thus, the data that has been written with an error on a sector is rewritten on another sector (which will be referred to herein as a "replacement sector").

A known read/write apparatus that makes such data correction is disclosed in Japanese Laid-Open Patent Publication No. 59-113509 (which will be referred to herein as "Patent Document No. 1" for convenience sake), for example.

Lately, as candidate read/write apparatuses that can save and archive data for a long time in order to meet the rising demand for storing a huge size of data with as high reliability as possible, proposed are an apparatus that uses a so-called "optical tape", which is a kind of an optical storage medium in a tape shape, and an apparatus that handles a combination of multiple optical disc drives at the same time. Such a read/write apparatus to process a huge size of data should not only write and transfer data at sufficiently high rates but also keep the reliability of the written data as high as possible.

Nevertheless, for a storage medium with a low degree of random accessibility such as the tape medium, it is difficult to increase the write rate as long as such a method of writing data and checking the data just written time-sequentially over and over again is adopted as in the known optical disc drive described above.

Thus, to meet such a demand, a so-called "DRAW (direct read after write)" technique for performing a write operation and a read operation for verification purposes at the same time has been proposed.

A known read/write apparatus that adopts such a DRAW technique is disclosed in Japanese Laid-Open Patent Publication No. 63-249941 (which will be referred to herein as "Patent Document No. 2" for convenience sake), for example. FIGS. 27A through 27C illustrate an exemplary arrangement and operation of an optical pickup as disclosed in Patent Document No. 2.

As shown in FIG. 27A, the optical system of this optical pickup includes a light source 410, a diffractive element 411, a polarization beam splitter 403, a wave plate 404, a collimator lens 405, a mirror 406, an objective lens 407, a detector lens 402, and a photodetector 401. The light emitted from the light source 410 gets diffracted by the diffractive element 411 and split mainly into a zero-order light beam and ±first-order light beams, which are then condensed by the objective lens 407, thereby forming three condensed beam spots (that are a main spot and two sub-spots) on the same track on the optical storage medium 408.

FIG. 27B illustrates the arrangement of light beam spots that are formed on the surface of the optical storage medium 408.

In the example illustrated in FIG. 27B, the main spot 500 formed by the zero-order light beam is a write beam spot, which is used to write a signal on the storage medium. On the other hand, the two sub-spots 510 and 520 formed by the ±first-order light beams are read beam spots, which are used to read the written signal. Due to the efficiency ratio of the diffraction grating, the intensities of the first-order light beams are much lower than that of the zero-order light beam. That is why the signal that has been written is never erased or altered by the two sub-spots 510, 520.

The main spot 500 and the sub-spots 510 and 520 are located on the same track. And these spots move on the storage medium in the direction indicated by the arrow a. Such movement of the main spot on a track of a storage medium will be referred to herein as "scanning the storage medium with a write beam". In the same way, such movement of the sub-spots on a track of a storage medium will be referred to herein as "scanning the storage medium with a read beam". In performing a DRAW operation, the same location on an optical storage medium is scanned with a write beam before being scanned with a read beam. More specifically, of these two sub-spots, the sub-spot 510 moves behind the write spot to read the recorded mark. Meanwhile, the other sub-spot 520 moves ahead of the write spot, and its reflected light includes no information about the recorded mark. These light beams are reflected from the optical storage medium 408, transmitted through the optical system, and then incident on the photodetector 401, which detects their quantities of light.

FIG. 27C illustrates the arrangement of photodiodes in the photodetector 401.

The main quadruple photodiode 121 shown in FIG. 27C receives the zero-order light beam (i.e., the reflected light that has left the main spot). The magnitude of astigmatism produced by the detector lens 402 shown in FIG. 27A changes with the degree of defocusing, thereby detecting a focus signal. The main photodiode 121 also detects a tracking error signal by the push-pull method. On the other hand, the sub-photodiodes 122 and 123 receive reflected light that has left the sub-spot 510 and reflected light that has left the sub-spot 520, respectively.

The light source 410 emits a light beam that has been modulated with a modulation signal in order to form information pits on the optical storage medium 408.

Naturally, the read beams that have been emitted from the same light source 410 have also gone through that modulation. That is why the reflected light of the sub-spot 510 that moves behind the write spot in the two read spots of the ±first-order light has a signal component, to which a variation in reflectance caused by a recorded mark and a variation in the quantity of light due to the modulation of light have been added. Meanwhile, the other sub-spot 520 moves ahead of the main spot 500 through an unrecorded portion, and therefore, its reflected light has not been affected by the variation in reflectance caused by the recorded mark. Consequently, only a signal representing a variation in the quantity of light due to the modulation of the light by the light source is obtained from the reflected light of the sub-spot 520 that moves ahead of the main spot 500. For that reason, by performing a differential arithmetic operation on the two signals representing those two sub-beams, a read signal (i.e., a monitor signal for verification purposes) can be obtained.

By adopting the DRAW technique for forming the write spot (i.e., the main spot 500) and the read spots (i.e., the sub-spots 510 and 520) at the same time and for reading a signal that has just been written while performing a write operation, a system that achieves even higher write and transfer rate and ensures a good deal of reliability is realized.

As already described as an example of the background art, an optical read/write apparatus that can get a DRAW operation done easily at a low cost may use a configuration for splitting the light that has been emitted from a single light source into a write beam and read beams. If such a configuration is adopted, however, a write modulation signal is also superposed on the read beams, and therefore, the write modulation component needs to be removed from the signal obtained based on the read beams. It is theoretically possible to remove the write modulation component by such a technique as what is used in the related art. However, while a write operation is being performed, the amplitude of the write modulation component in a sub-beam signal is actually much greater than that of a signal representing a recorded mark component. That is to say, although the dynamic range of the circuit needs to be set to prevent the sub-beam signal from getting saturated with the write modulation component, the signal component of the recorded mark component obtained in such a situation becomes very small. In addition, it is very difficult to remove the write modulation component perfectly due to a subtle differential balance to be struck when the write modulation component is obtained by calculating the difference from another sub-beam signal or a difference in frequency characteristic or delay between the signals. For these reasons, a highly sophisticated signal processing system should be used to keep the SNR of the DRAW signal high enough.

Thus, an embodiment of the present disclosure provides an optical read/write apparatus that can get the DRAW operation done with good stability.

SUMMARY OF THE INVENTION

An optical read/write apparatus according to one aspect of the present disclosure includes: a plurality of light sources including a first light source and a second light source; an optical system which converges, onto an optical storage medium, a write beam emitted from the first light source and a read beam emitted from the second light source so that the same location on the optical storage medium is scanned with the write beam before being scanned with the read beam; a signal detector which senses the write and read beams that have been reflected from the optical storage medium and which generates electrical signals; a power monitoring detector which monitors the optical powers of the first and second light sources; and a control section which controls the optical powers of the first and second light sources and which modulates the optical power of the first light source so that a signal mark is recorded on the optical storage medium with the write beam in a write mode. In an optical power control range in which writing user data on the optical storage medium is temporarily suspended, the control section writes non-user data on the optical storage medium and turns the second light source OFF while writing the non-user data. The power monitoring detector obtains optical power information of the first light source while the second light source is OFF.

In one embodiment, the non-user data includes at least one of address data and a sync signal.

In another embodiment, the control section leaves a data unrecorded area in the optical power control range on the optical storage medium.

In still another embodiment, the control section writes the address data adjacently to the optical power control range on the optical storage medium.

In yet another embodiment, optical power information of the first light source and optical power information of the second light source are obtained from the same optical power control range.

In yet another embodiment, optical power information of the second light source is obtained with the first light source turned OFF.

In this particular embodiment, after the optical power information of the second light source has been obtained, the optical power information of the first light source is obtained.

In yet another embodiment, when the non-user data finishes being written with the write beam, a spot of the read beam is located on the non-user data.

In yet another embodiment, a time t it takes for the write beam or the read beam to pass through the optical power control range and one period T of the optical power control operation satisfy the inequality T/t≥100.

An optical read/write apparatus according to another aspect of the present disclosure includes: a plurality of light sources including a first light source and a second light source; an optical system which converges, onto an optical storage medium, a write beam emitted from the first light source and a read beam emitted from the second light source so that the same location on the optical storage medium is scanned with the write beam before being scanned with the read beam; a signal detector which senses the write and read beams that have been reflected from the optical storage medium and which generates electrical signals; a power monitoring detector which monitors the optical powers of the first and second light sources; and a control section which controls the optical powers of the first and second light sources and which modulates the optical power of the first light source so that a signal mark is recorded on the optical storage medium with the write beam in a write mode. The control section controls the optical powers of the first and second light sources based on a power monitor signal sampled in the output of the power monitoring detector.

In one embodiment, the timing to sample the power monitor signal is determined based on a modulation signal that is used to modulate the optical power of the first light source.

In this particular embodiment, the modulation signal has a waveform that changes between two or more levels, and when the level of the modulation signal is lower than its maximum value, the power monitor signal is sampled for the second light source.

In a specific embodiment, when the modulation signal has the lowest level, the power monitor signal is sampled for the second light source.

In a more specific embodiment, when the modulation signal has a level at which a mark that has been recorded on the storage medium is erased with the write beam, the power monitor signal is sampled for the second light source.

In an alternative embodiment, if the modulation signal continues to have a level at which a mark that has been recorded on the storage medium is erased with the write beam for a predetermined period or more, the power monitor signal is sampled for the second light source.

In yet another embodiment, the power monitoring detector includes a line to output a power monitor signal for the first light source and another line to output a power monitor signal for the second light source.

In this particular embodiment, the optical read/write apparatus includes a first gain adjuster that adjusts the gain of the power monitor signal for the first light source and a second gain adjuster that adjusts the gain of the power monitor signal for the second light source.

In a specific embodiment, the gain of the power monitor signal for the second light source is set to be higher than the gain of the power monitor signal for the first light source.

In another embodiment, the gains are adjusted so that the second light source's output component, which is included in the power monitor signal for the second light source, becomes substantially equal to the value of the power monitor signal for the first light source when the power monitor signal for the second light source is sampled.

In still another embodiment, the gain of the power monitor signal for the second light source is adjustable according to any change of the optical power of the first light source.

In yet another embodiment, the power monitoring detector includes a photodiode that has been divided into a first area to generate the power monitor signal for the first light source and a second area to generate the power monitor signal for the second light source.

In yet another embodiment, in an amplifier that transforms photo-current obtained from the second area into a voltage, light that has been incident there from the first light source has a saturated crest value.

In yet another embodiment, the power of the second light source is changed in a range where a timing signal is OFF.

According to an embodiment of the present disclosure, a DRAW operation can be performed using multiple light sources.

Other features, elements, processes, steps, characteristics and advantages of the present disclosure will become more apparent from the following detailed description of embodiments of the present disclosure with reference to the attached drawings.

Figure 7:
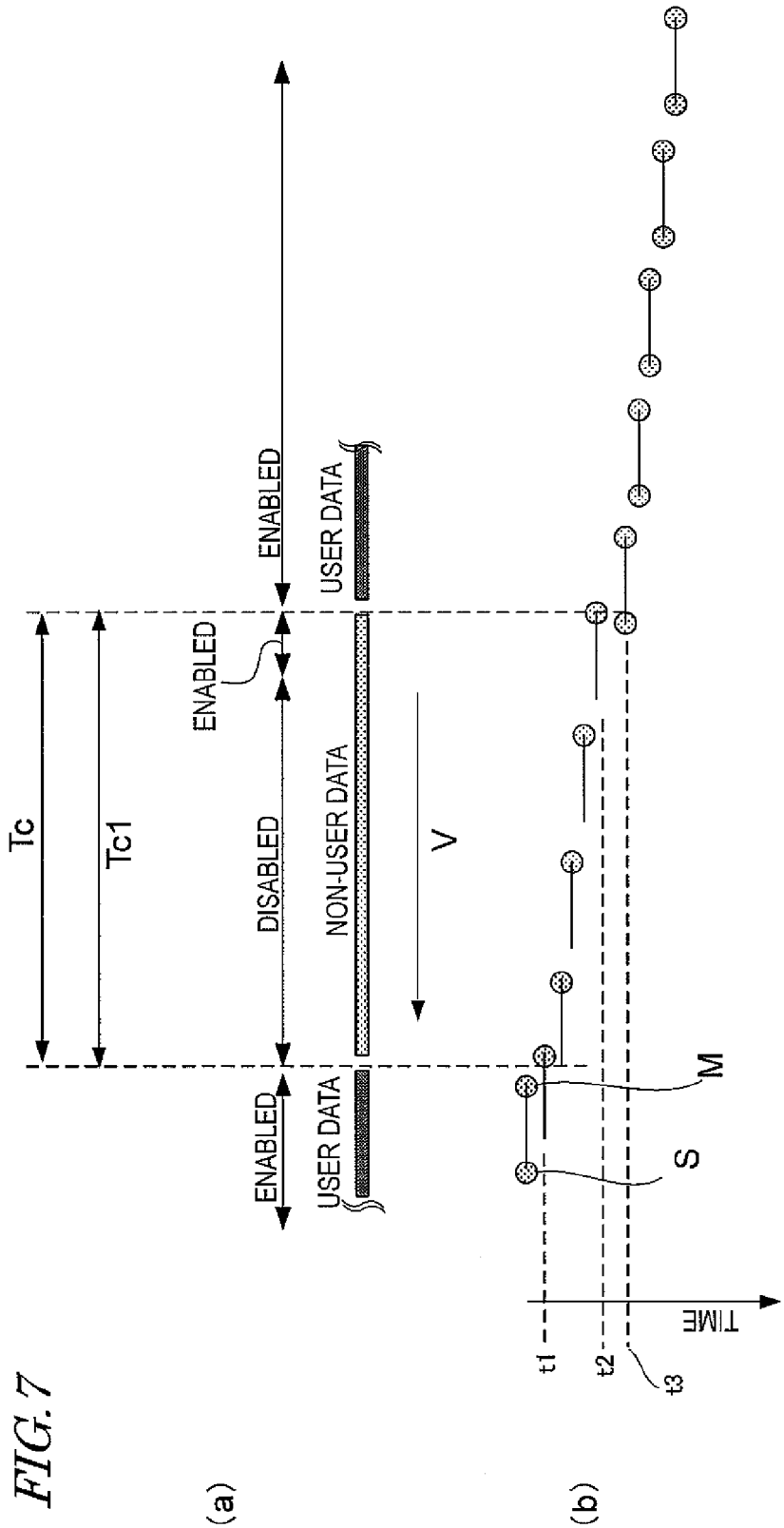

Portion (a) of FIG. 7 illustrates the storage state of an optical storage medium according to the first embodiment of the present disclosure and portion (b) of FIG. 7 illustrates how light beam spots move on it.

Figure 8:
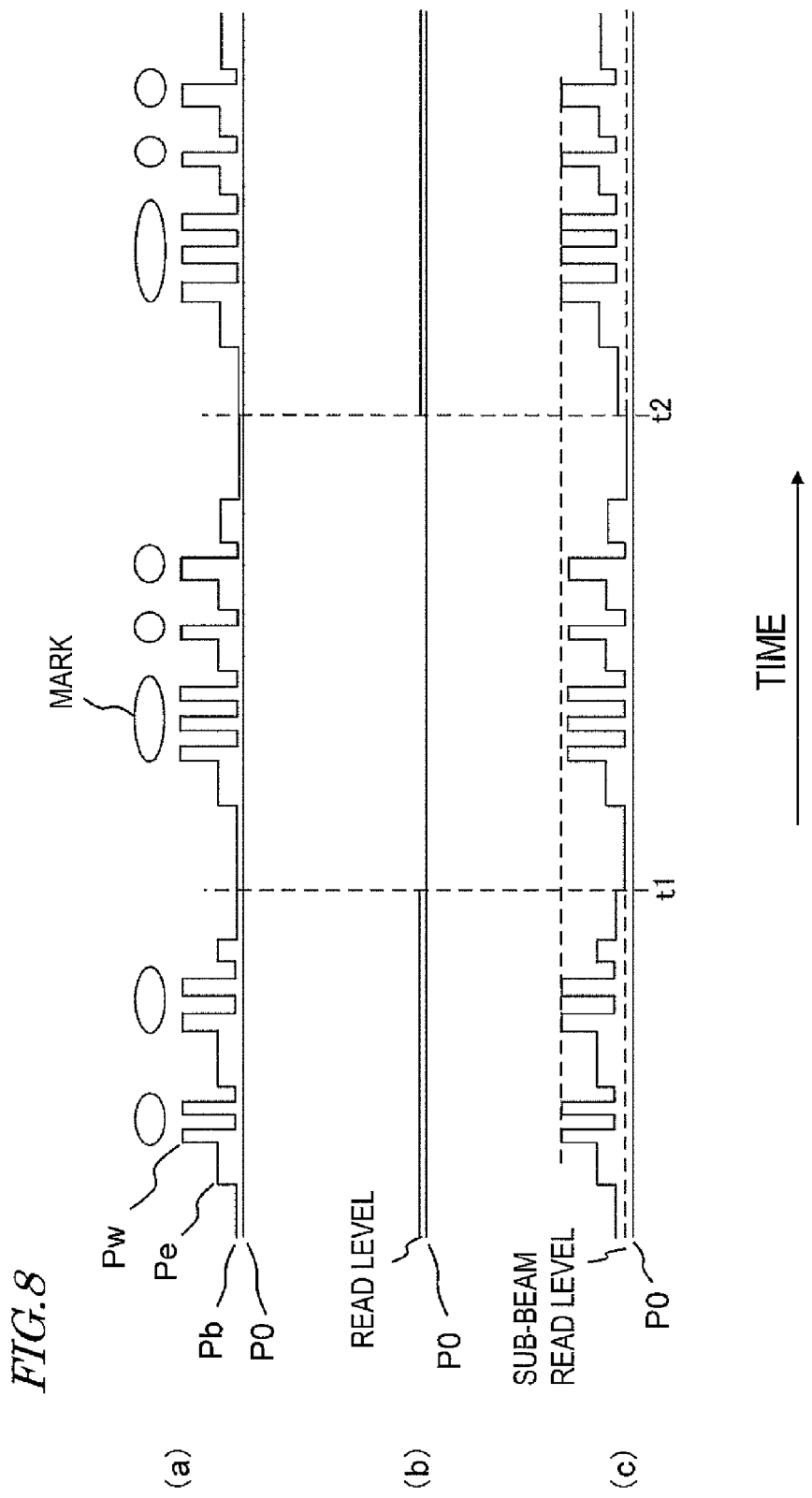

Portions (a), (b) and (c) of FIG. 8 show how the respective optical powers of main and sub-beams and the output of the power monitoring detector change with time in the first embodiment of the present disclosure.

Figure 9:
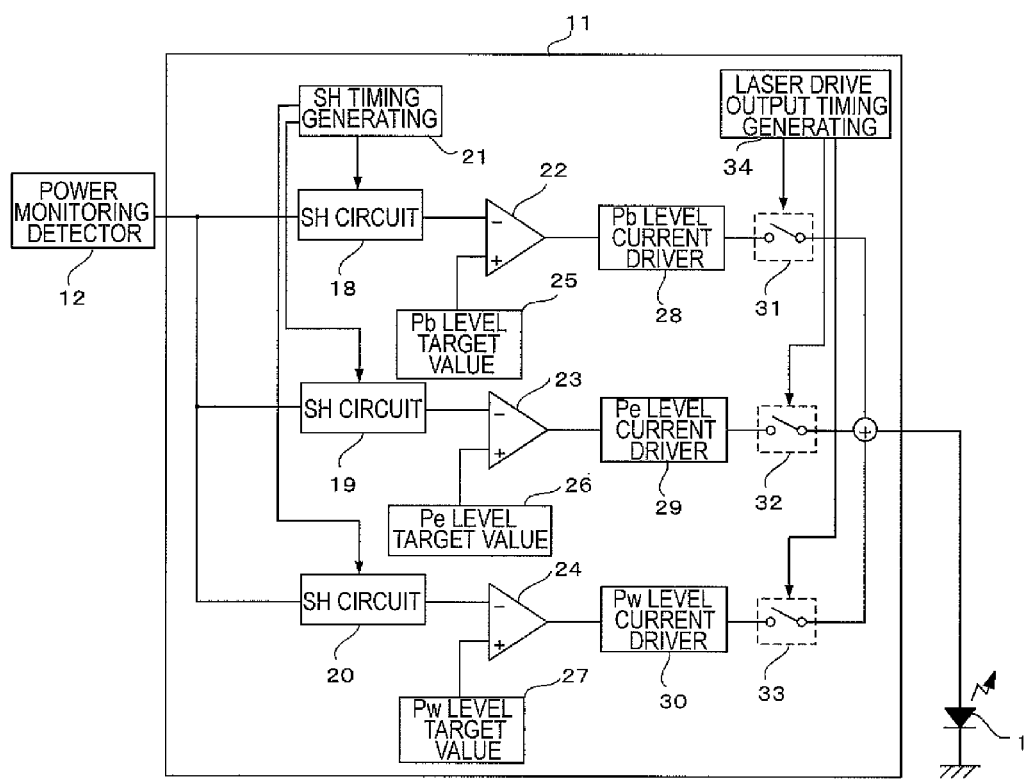

FIG. 9 is a block diagram illustrating some elements of a light source control section according to the first embodiment of the present disclosure.

Figure 10:
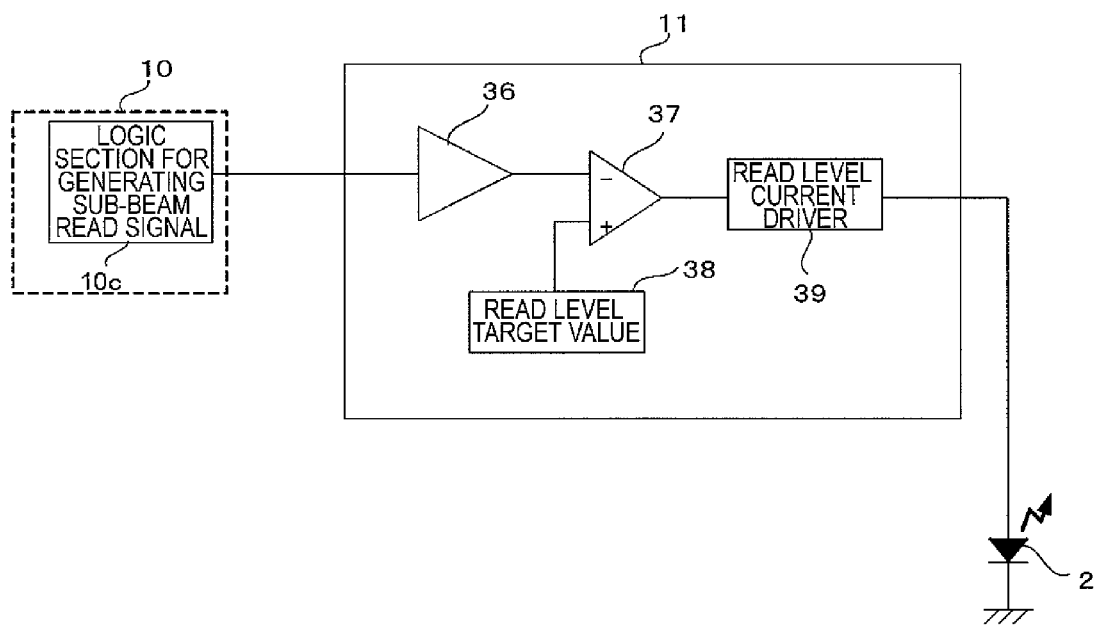

FIG. 10 is a block diagram illustrating other elements of a light source control section according to the first embodiment of the present disclosure.

Figure 11:
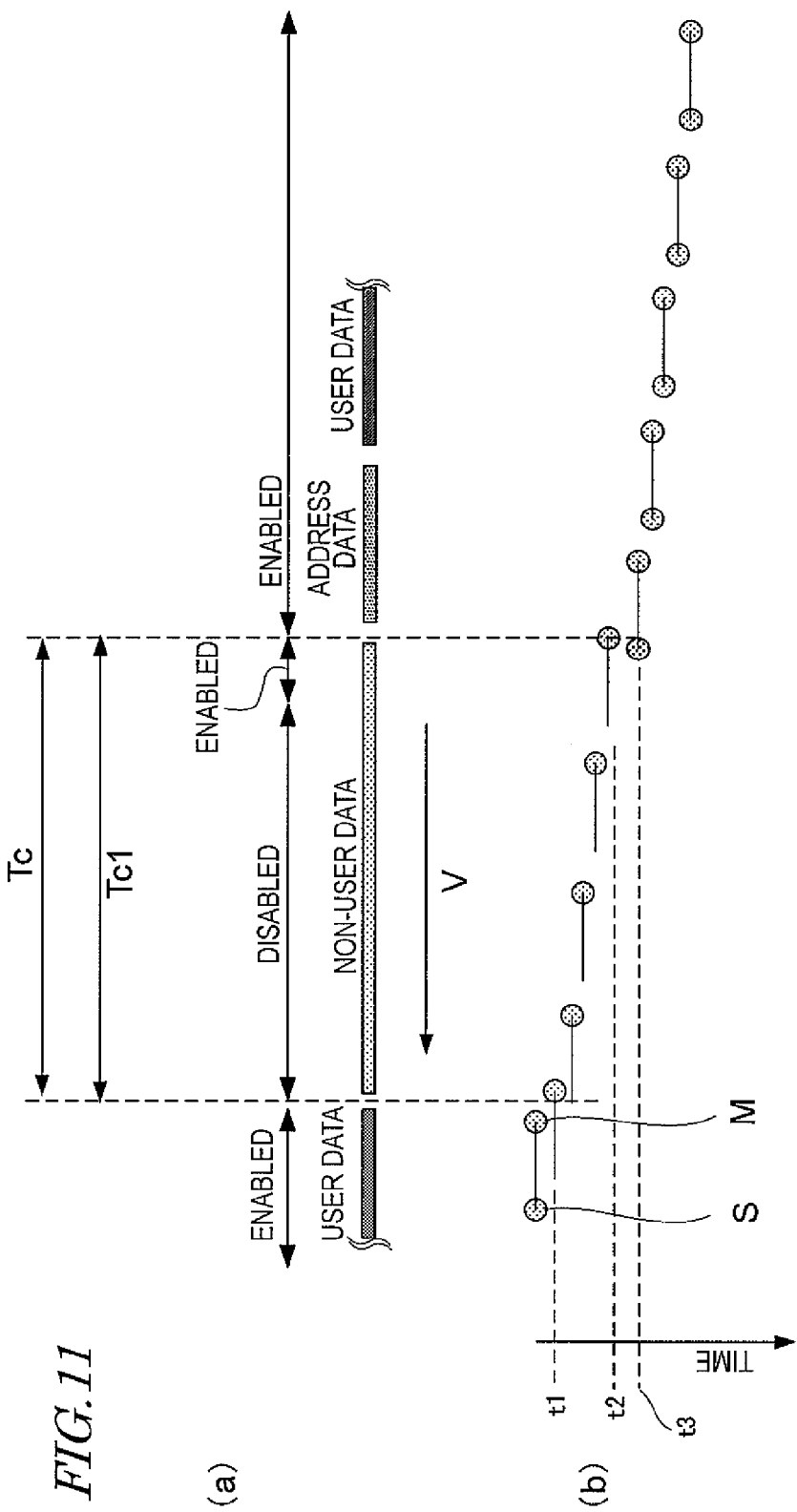

Portion (a) of FIG. 11 illustrates the storage state of an optical storage medium in another example according to the first embodiment of the present disclosure and portion (b) of FIG. 11 illustrates how light beam spots move on it.

Figure 12:
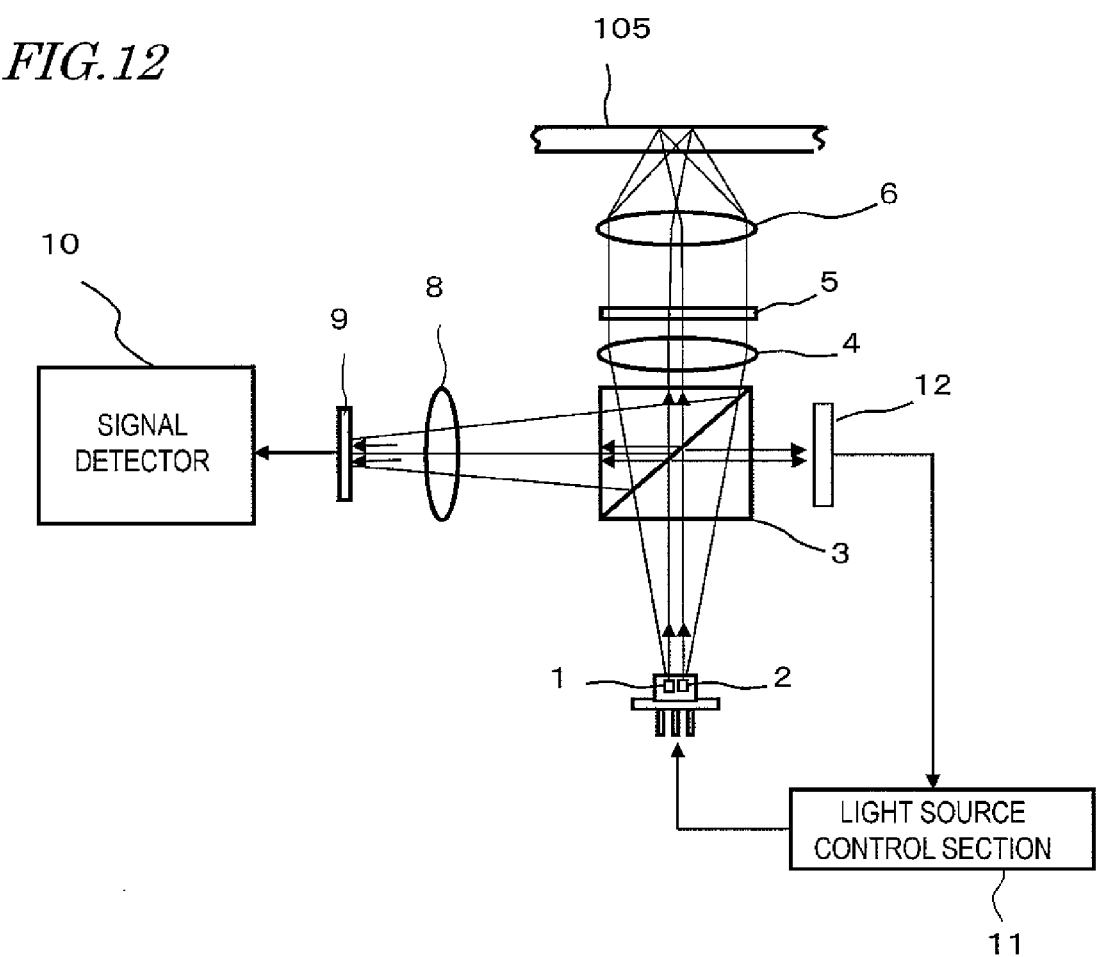

FIG. 12 illustrates an arrangement for an optical read/write apparatus according to a second embodiment of the present disclosure.

Figure 13:
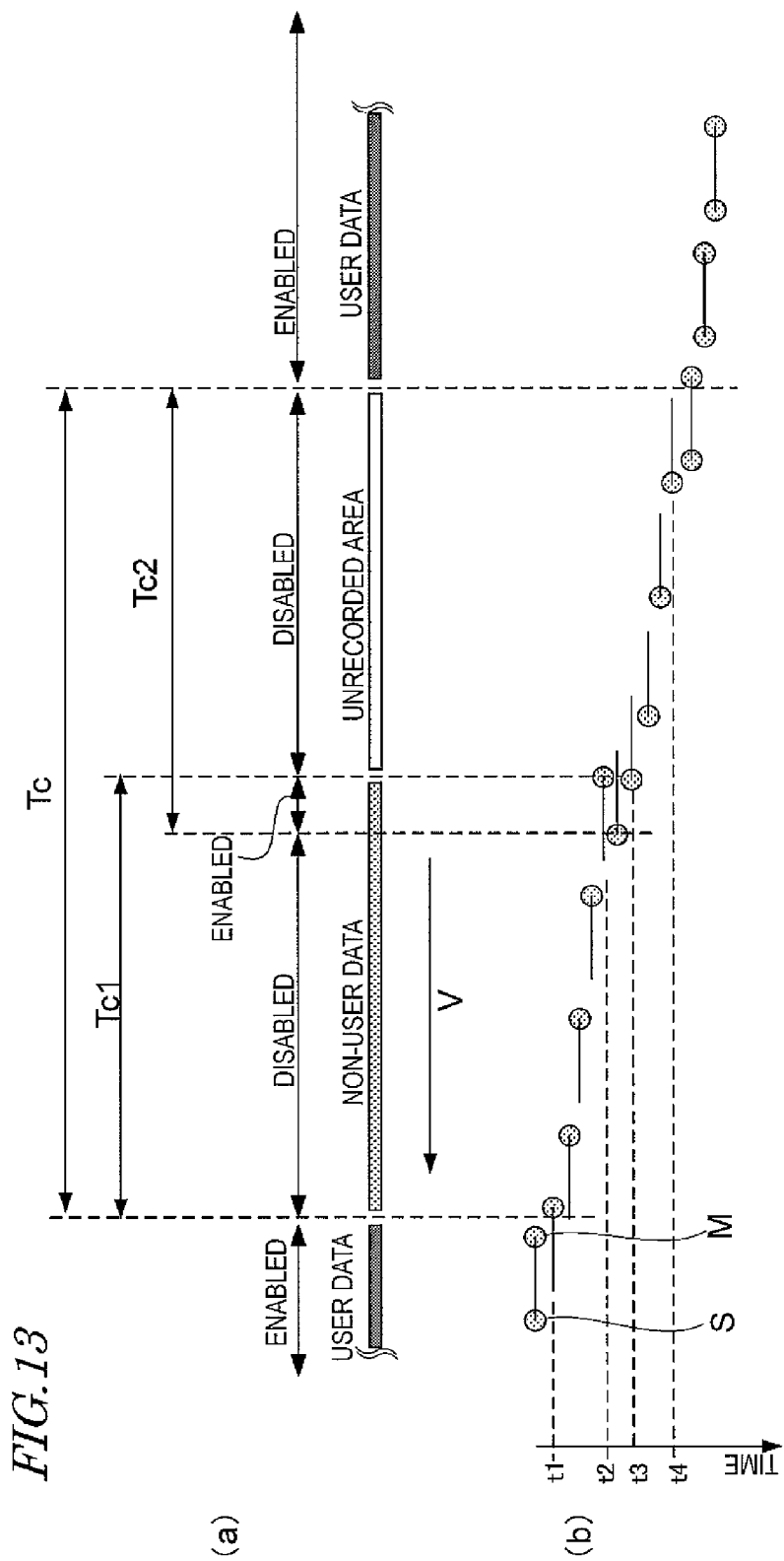

Portion (a) of FIG. 13 illustrates the storage state of an optical storage medium according to the second embodiment of the present disclosure and portion (b) of FIG. 13 illustrates how light beam spots move on it.

Figure 14:
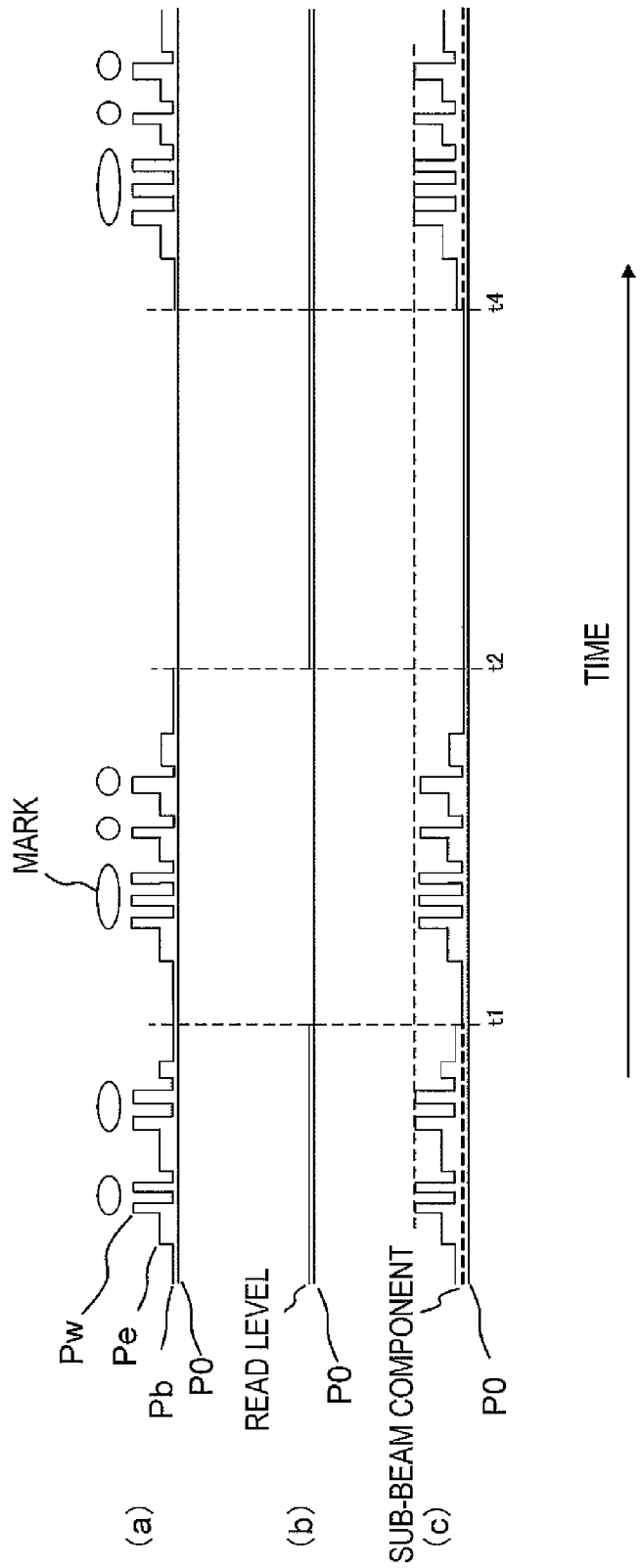

Portions (a), (b) and (c) of FIG. 14 show how the respective optical powers of main and sub-beams and the output of the power monitoring detector change with time in the second embodiment of the present disclosure.

Figure 15:
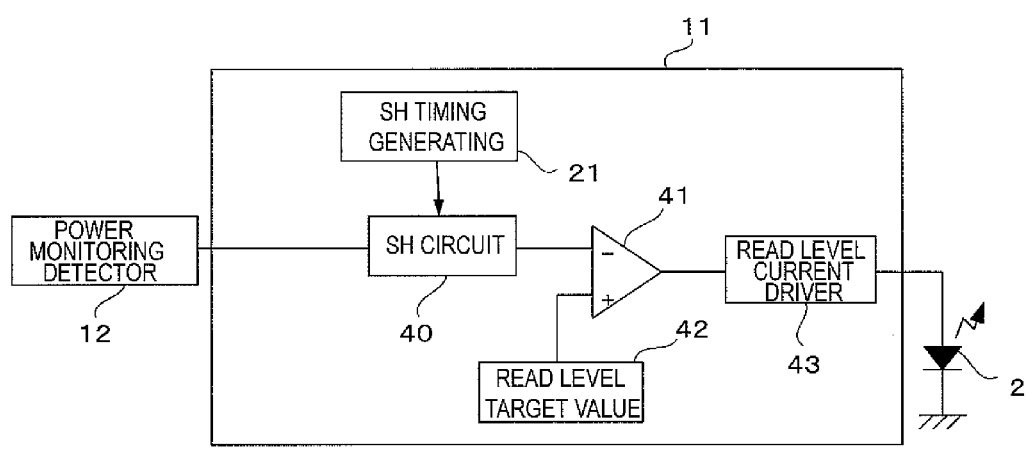

FIG. 15 is a block diagram illustrating some elements of a light source control section according to the second embodiment of the present disclosure.

Figure 16:
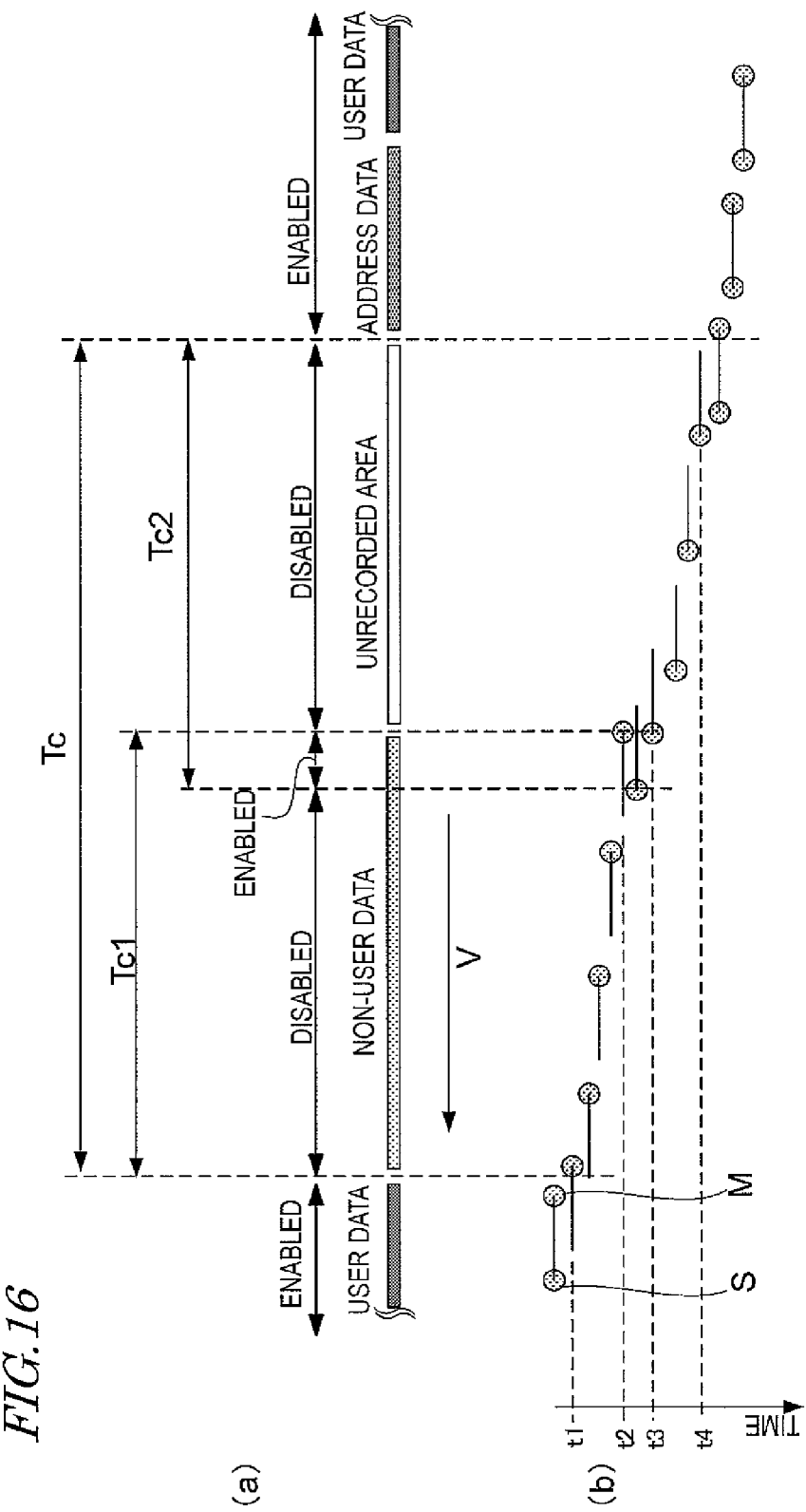

Portion (a) of FIG. 16 illustrates the storage state of an optical storage medium in another example according to the second embodiment of the present disclosure and portion (b) of FIG. 16 illustrates how light beam spots move on it.

Figure 17:
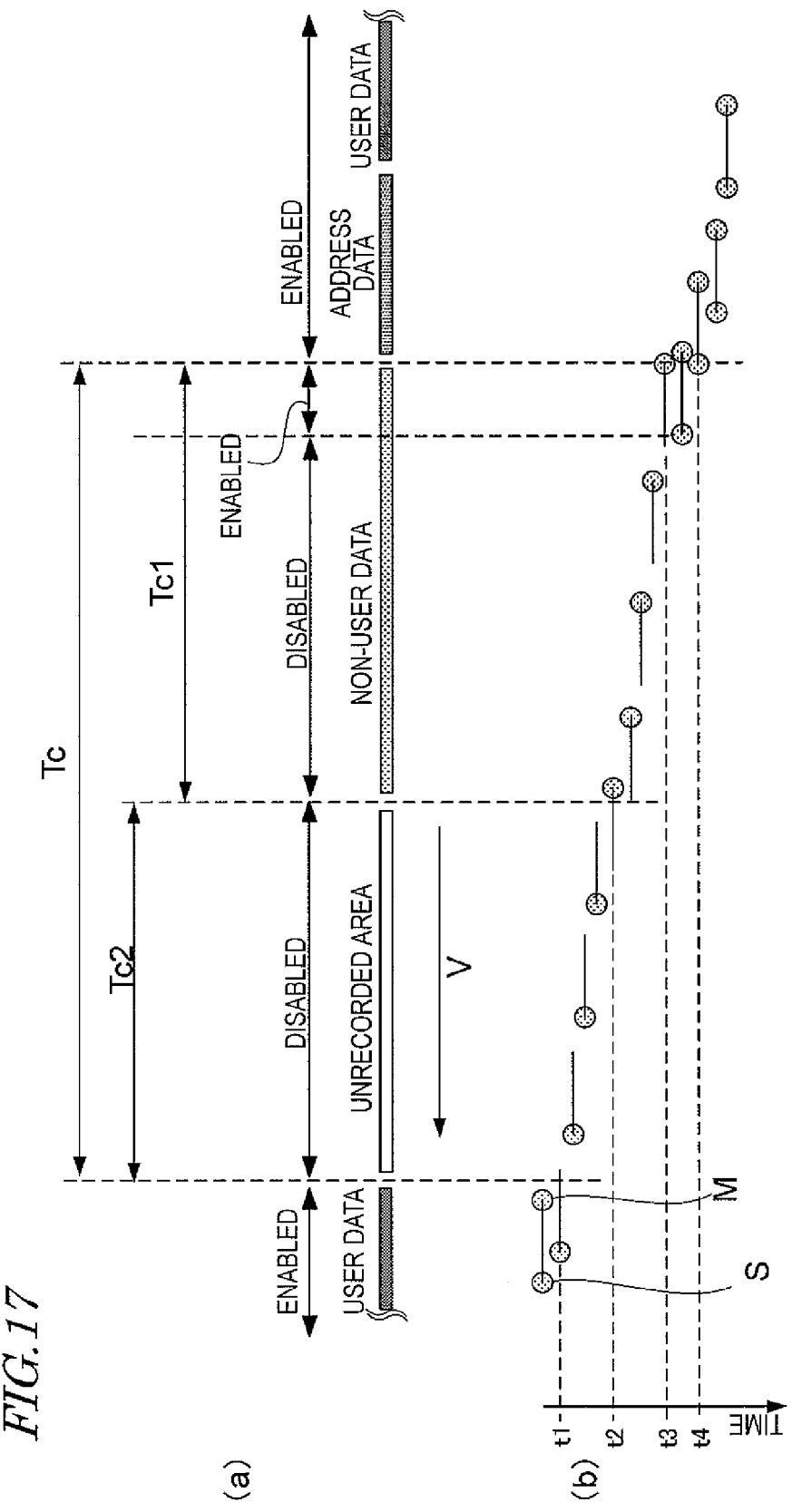

Portion (a) of FIG. 17 illustrates the storage state of an optical storage medium in another example according to the second embodiment of the present disclosure and portion (b) of FIG. 17 illustrates how light beam spots move on it.

Figure 18:
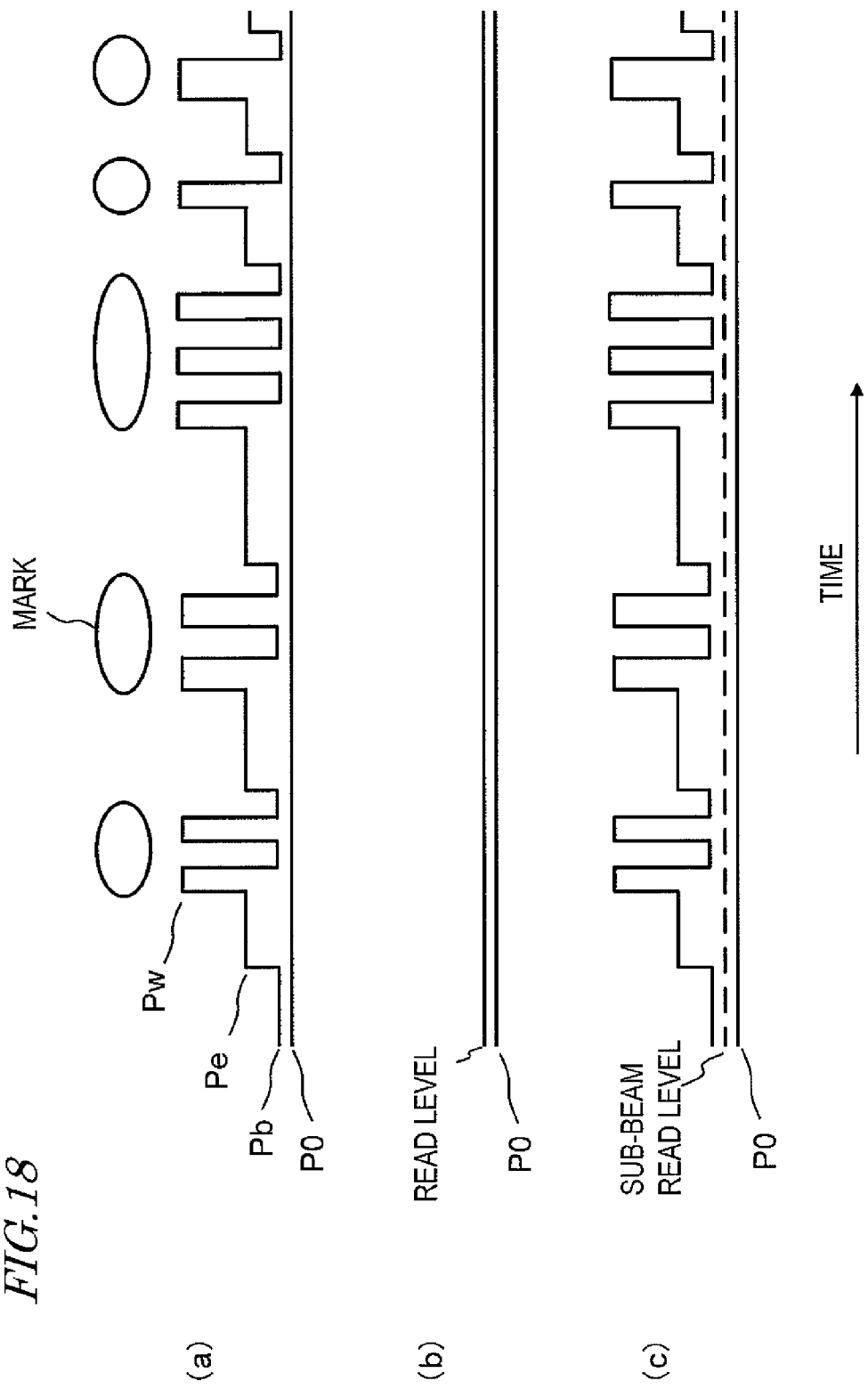

Portions (a), (b) and (c) of FIG. 18 show how the respective optical powers of main and sub-beams and the output of the power monitoring detector change with time in a third embodiment of the present disclosure.

Figure 19:
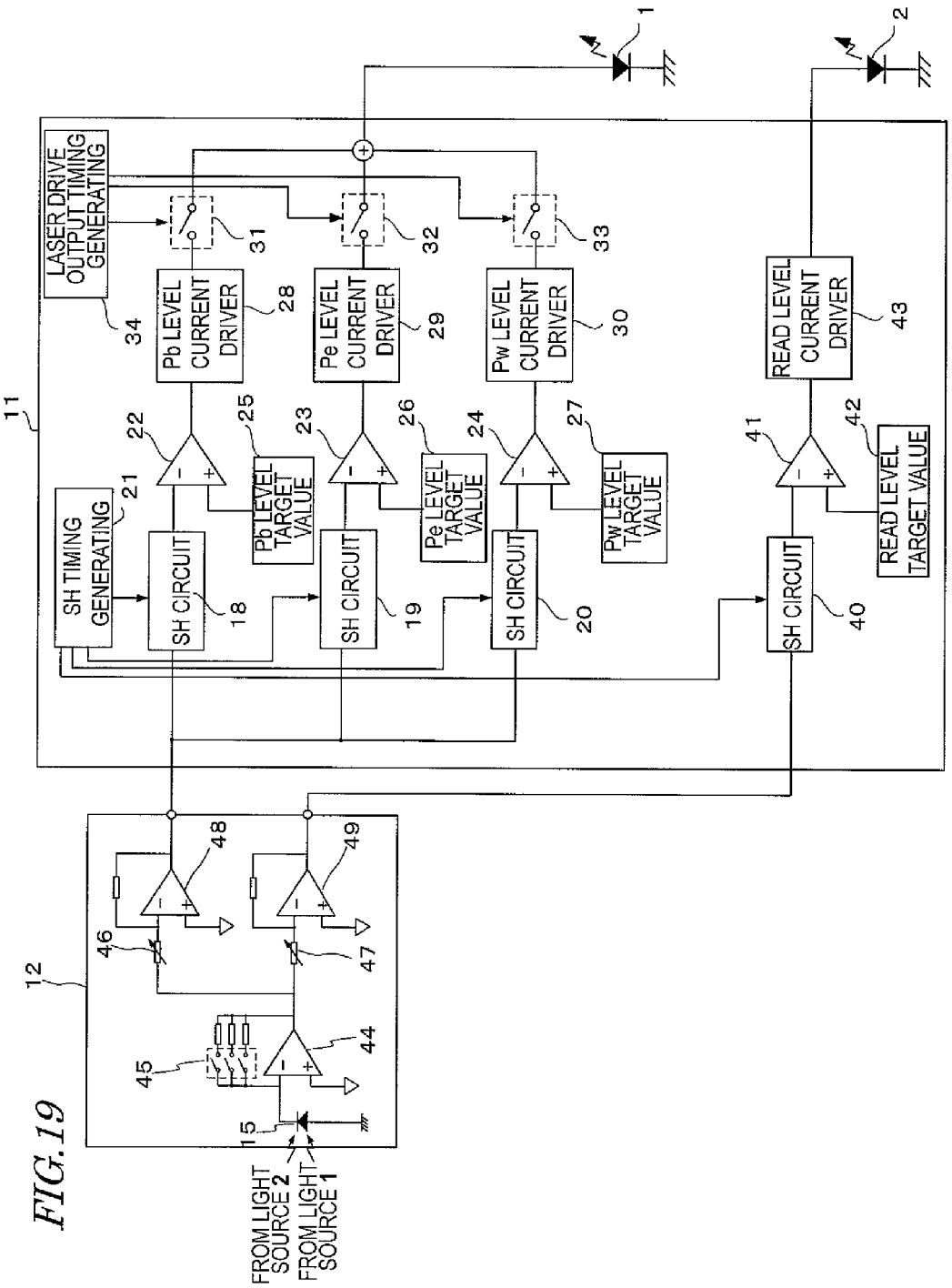

FIG. 19 is a block diagram illustrating a configuration for a light source control section according to a fourth embodiment of the present disclosure.

Figure 20:
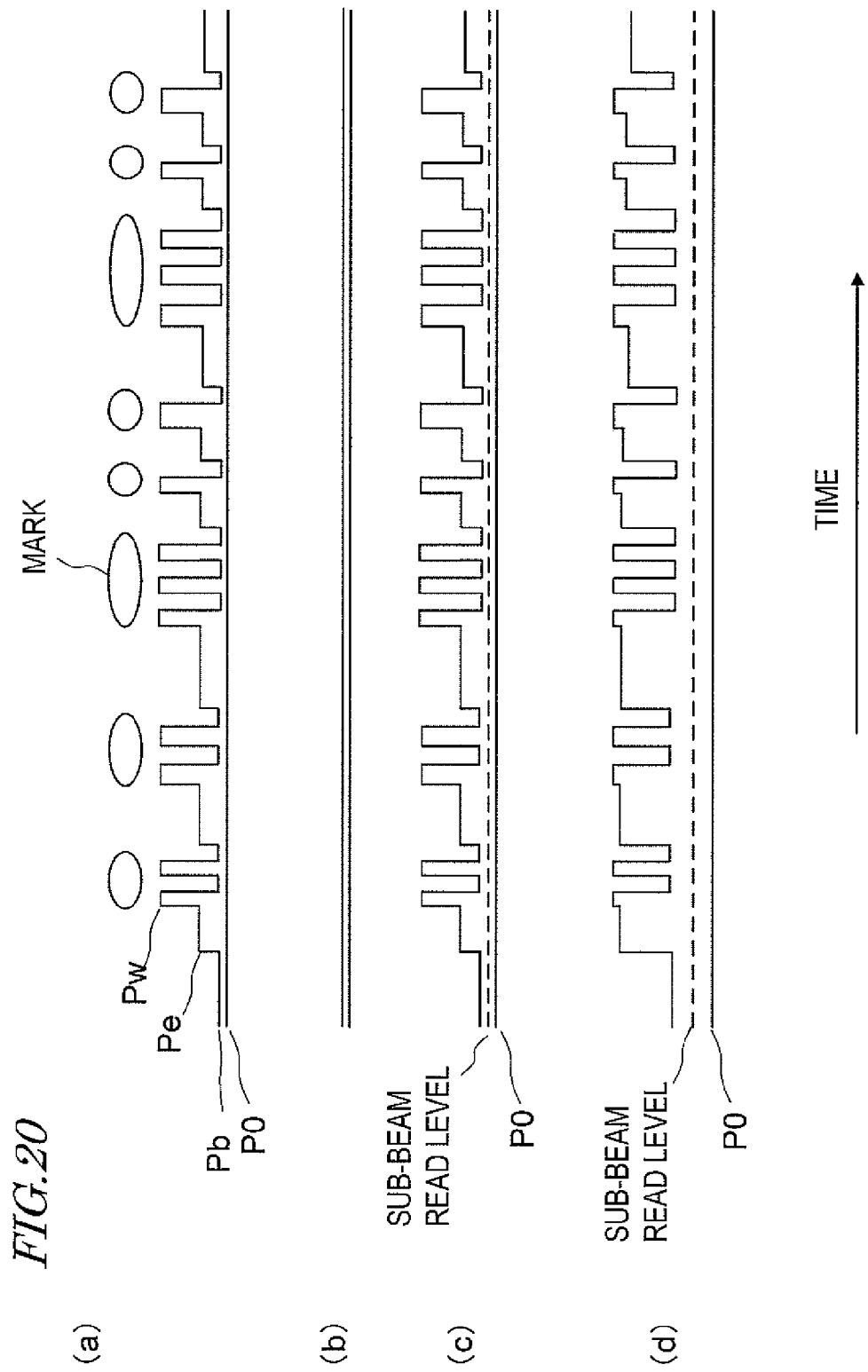

Portions (a), (b), (c) and (d) of FIG. 20 show the optical power of a main beam, the optical power of a sub-beam, the output waveform of a VV amplifier for the main beam, and the output waveform of a VV amplifier for the sub-beam, respectively, in one example according to the fourth embodiment of the present disclosure.

Figure 21:
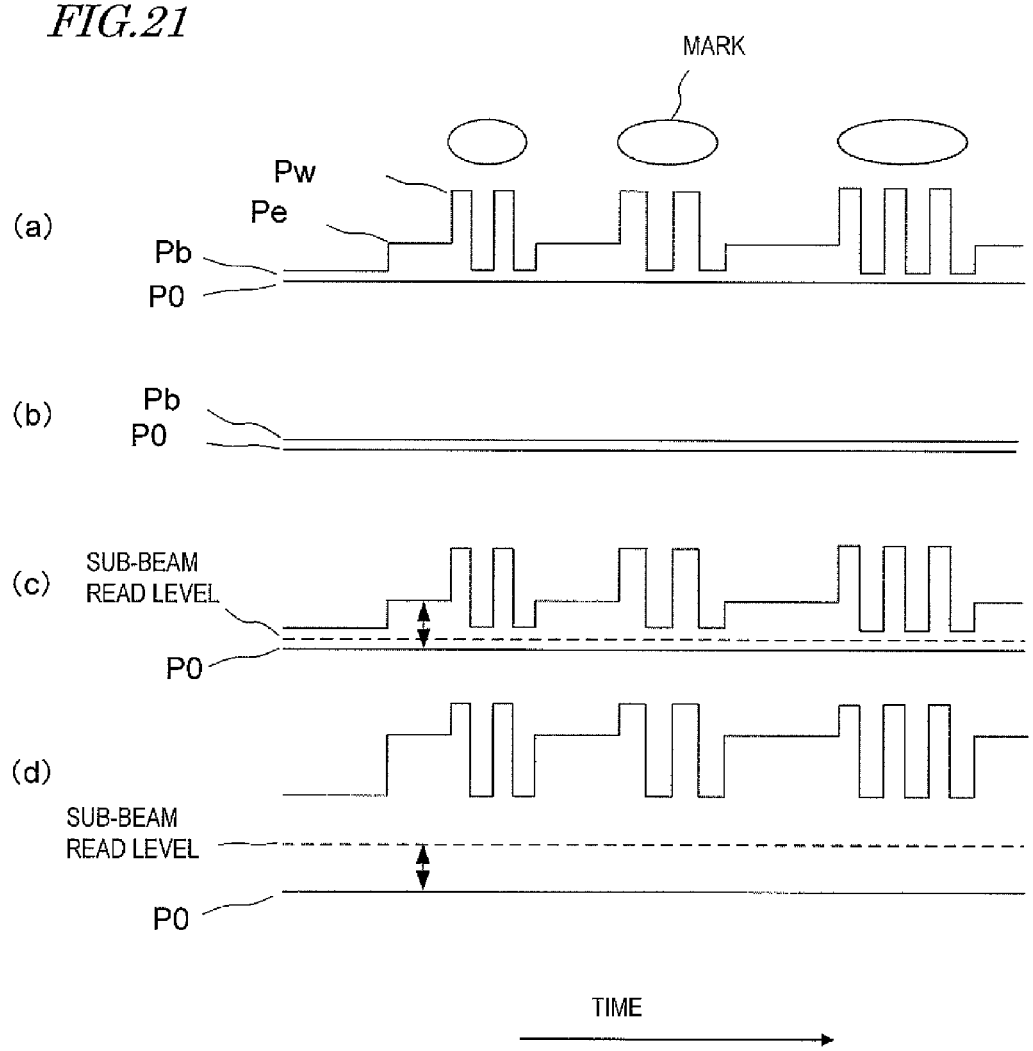

Portions (a), (b), (c) and (d) of FIG. 21 show the optical power of a main beam, the optical power of a sub-beam, the output waveform of a VV amplifier for the main beam, and the output waveform of a VV amplifier for the sub-beam, respectively, in another example according to the fourth embodiment of the present disclosure.

Figure 22:
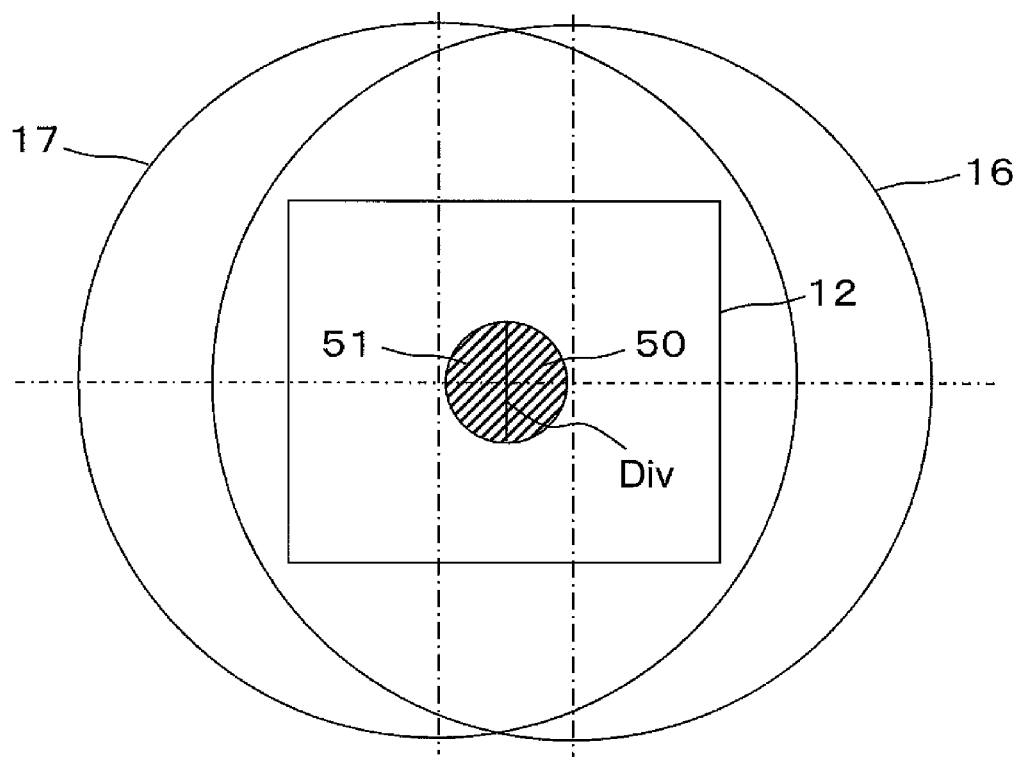

FIG. 22 illustrates a power monitoring detector according to the fourth embodiment of the present disclosure.

Figure 23:
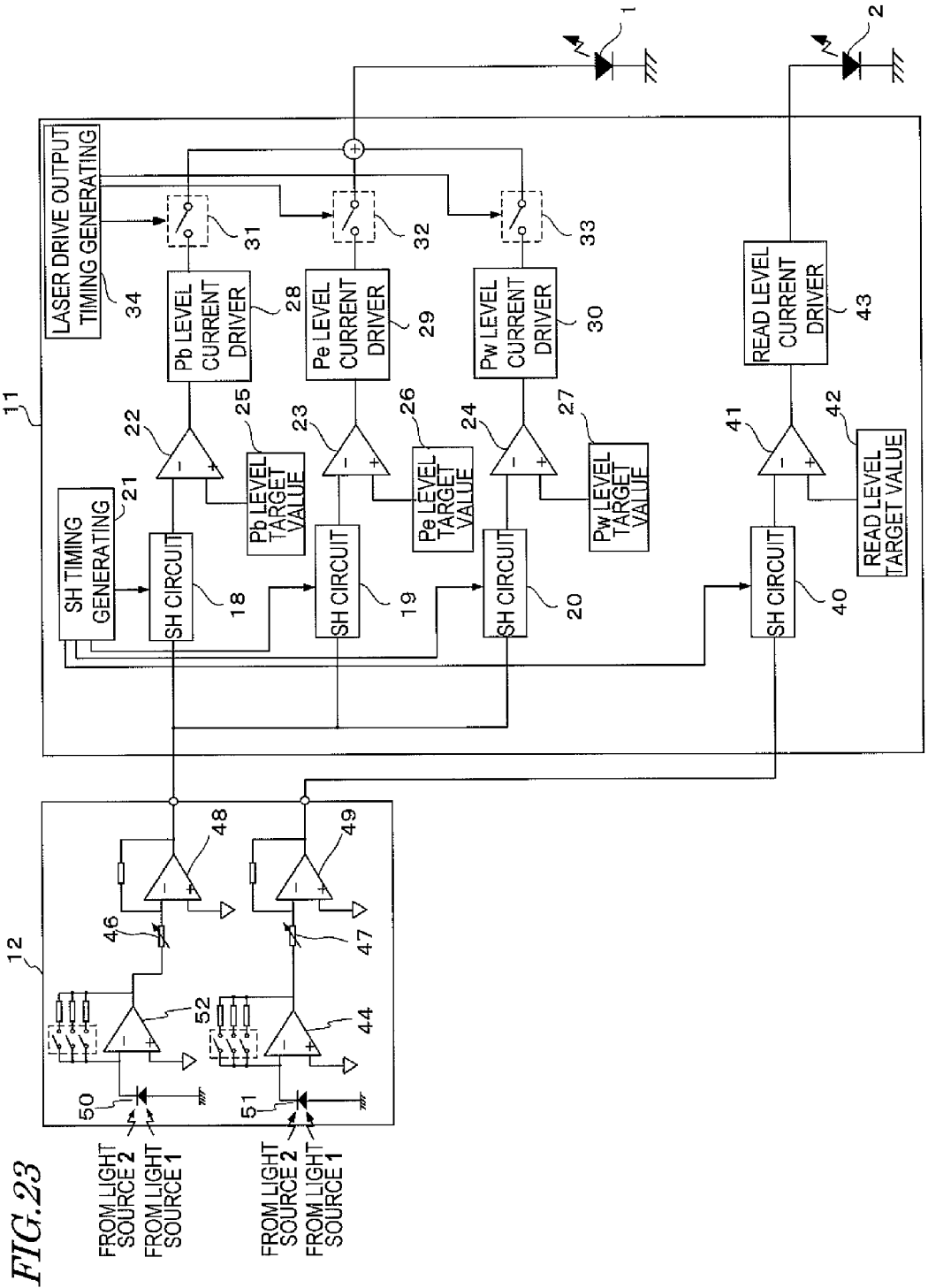

FIG. 23 is a block diagram illustrating an alternative configuration for a light source control section according to the fourth embodiment of the present disclosure.

Figure 24:
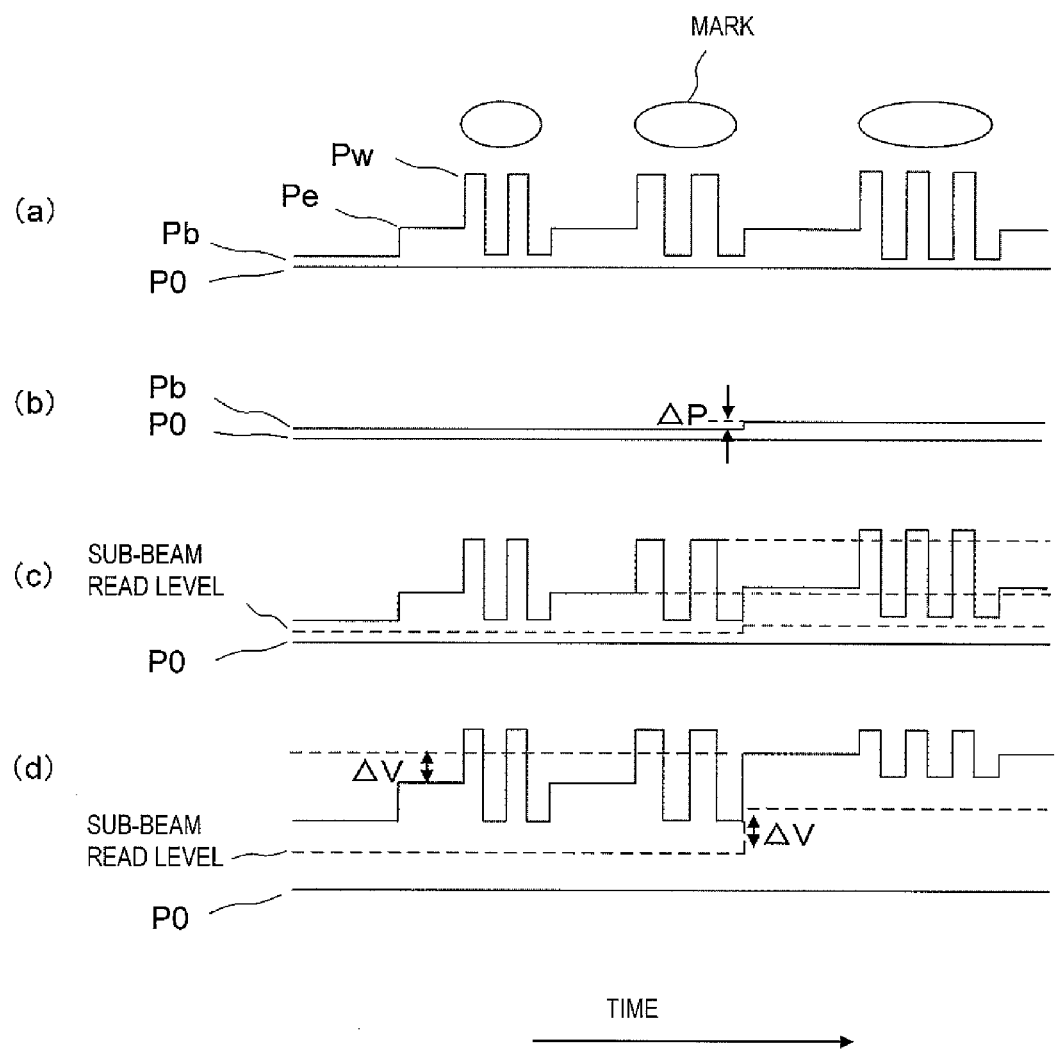

Portions (a), (b), (a) and (d) of FIG. 24 show the optical power of a main beam, the optical power of a sub-beam, the output waveform of a VV amplifier for the main beam, and the output waveform of a VV amplifier for the sub-beam, respectively, according to a fifth embodiment of the present disclosure.

Figure 25:
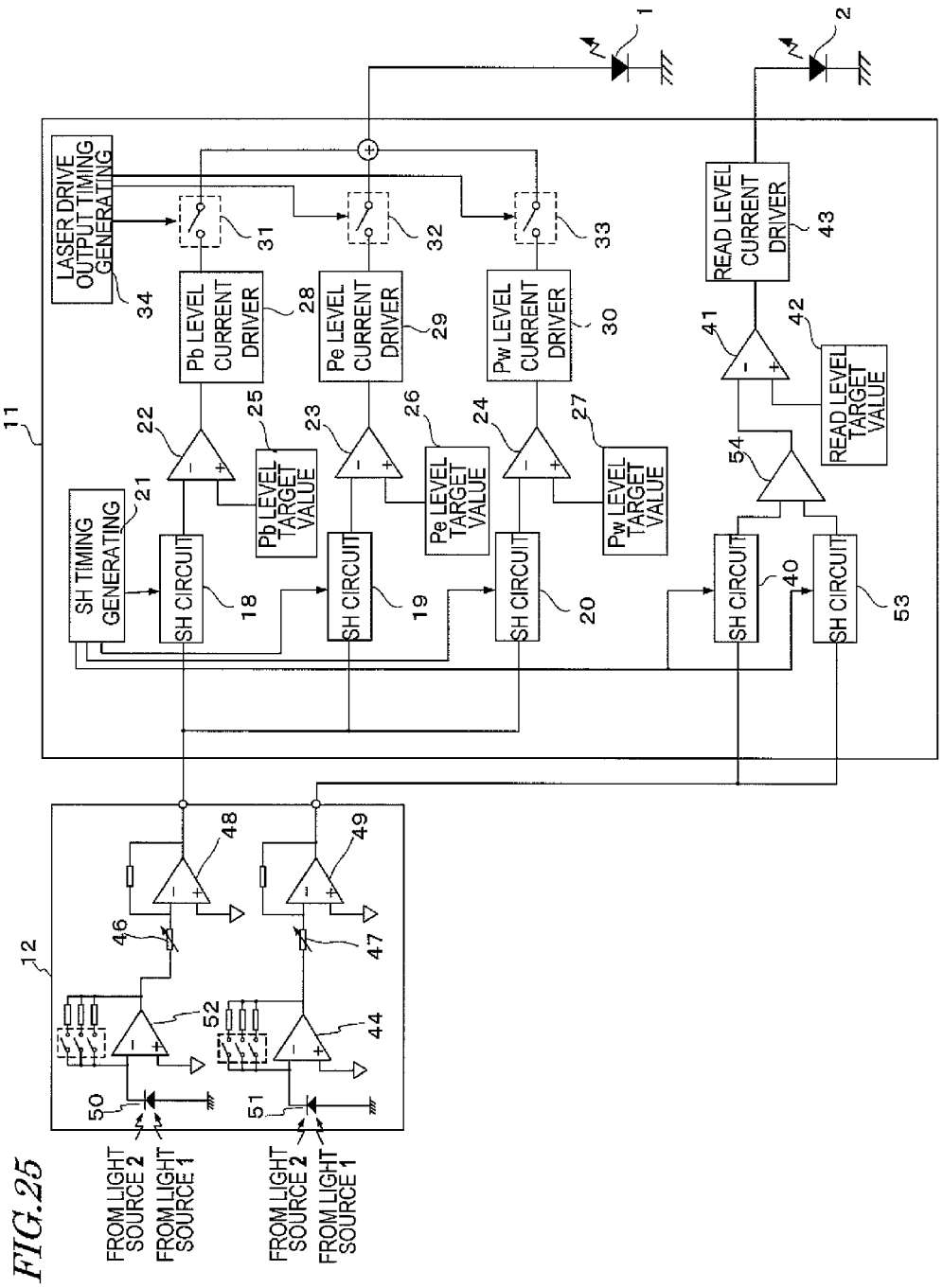

FIG. 25 is a block diagram illustrating a configuration for a light source control section according to the fifth embodiment of the present disclosure.

FIG. 26A shows an exemplary waveform of a read signal representing non-user data.

FIG. 26B shows another exemplary waveform of a read signal representing non-user data.

FIG. 26C shows still another exemplary waveform of a read signal representing non-user data.

Figure 27A:
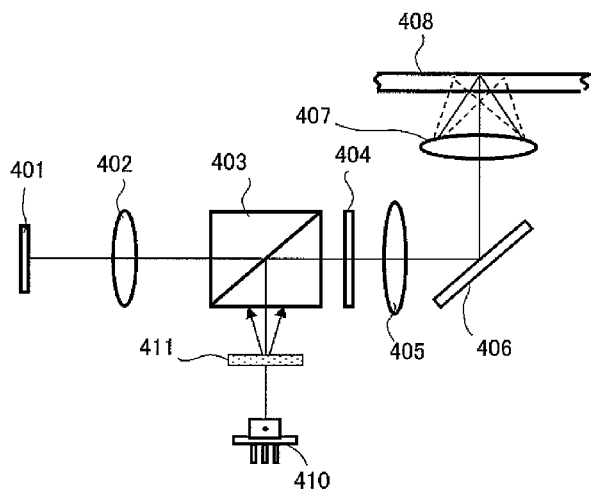

FIG. 27A illustrates an arrangement for a known optical read/write apparatus.

Figure 27B:
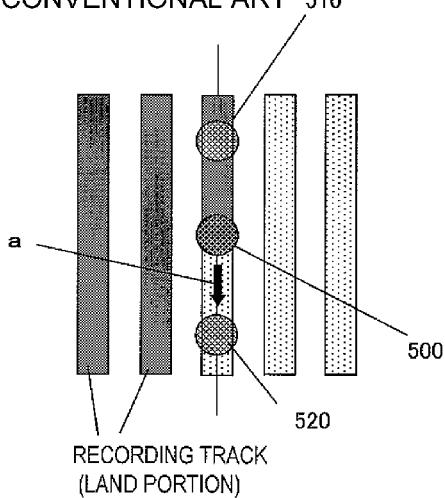

FIG. 27B shows how spots move on an optical storage medium in the known optical read/write apparatus.

Figure 27C:
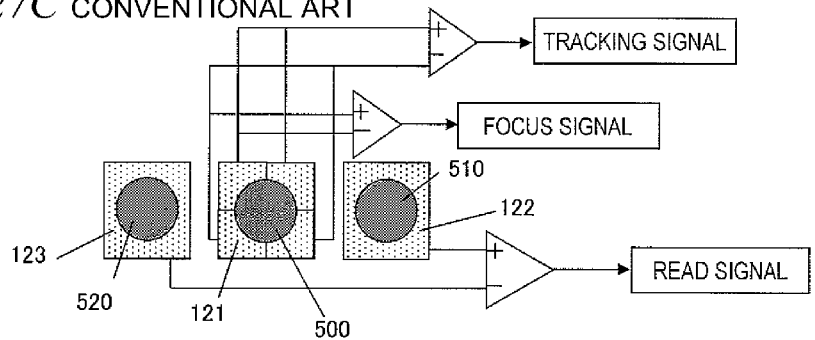

FIG. 27C illustrates a configuration for a signal detector in the known optical read/write apparatus.

DETAILED DESCRIPTION OF EMBODIMENTS

To overcome the problem with the related art in which a main beam for writing and sub-beams for reading are formed by splitting a single light beam that has been emitted from the same light source, it has been proposed that the DRAW operation be performed by providing two separate light sources for the main beam and the sub-beams, respectively. Even so, those light sources are usually arranged so close to each other that the light beams emitted from those light sources go through the same optical system in an overlapping state. That is why those light beams emitted from the light sources are also incident in such an overlapping state on a power monitoring element which is arranged somewhere in the optical system. Meanwhile, to perform the DRAW operation, the optical powers of the respective light sources need to be controlled independently of each other. Nevertheless, in order to separate the light beams emitted from the respective light sources and detect them independently of each other, a special optical system should be provided, which would not only complicate the structure of the apparatus but also increase its overall size and cost as well. On top of that, if the operation of writing user data or the DRAW operation should be suspended for a long time in order to obtain information about the optical power of the light source or to control the optical power, the performance of the apparatus would decline eventually.

Hereinafter, embodiments of an optical read/write apparatus according to the present disclosure will be described with reference to the accompanying drawings.

In an embodiment of the present disclosure, even in an arrangement such as a laser array that uses multiple light sources, optical power information can be obtained from each of those light sources and their optical powers can be controlled independently of each other without using any special optical system for separating the light beams from those light sources. Specifically, in an embodiment of the present disclosure, an "optical power control range" where the operation of writing user data is suspended is defined as a part of a storage medium and non-user data is written on that range. The optical power control range may be set to be short enough to cause substantially no decrease in the storage capacity or density of the storage medium. It should be noted that the optical power control range does not have to be defined in advance on the storage medium separately from the rest of the storage medium. But the optical power control range may be provided on the storage medium either occasionally or on a regular basis when a signal is going to be written on the storage medium using an optical pickup.

In another embodiment of the present disclosure, by obtaining the optical power information of each light source using a timing signal that has been generated based on write modulation data, the optical powers of those multiple light sources can be controlled without suspending the operation of writing user data or the DRAW operation. According to these embodiments, the DRAW operation can get done with good stability using a simple configuration.

Hereinafter, embodiments of the present disclosure will be described in detail.

Embodiment 1

First of all, an optical read/write apparatus as a first embodiment of the present disclosure will be described. An optical read/write apparatus as an embodiment of the present disclosure is an optical data streamer apparatus that uses an optical tape as an optical storage medium. Such an optical data streamer apparatus may be used to back up a huge quantity of data. In order to back up such an enormous quantity of data in a short time with the transfer rate increased, the optical data streamer apparatus includes a lot of optical pickups. It should be noted that the optical read/write apparatus of the present disclosure does not have to be an optical data streamer apparatus but may also be an optical disc apparatus or any other kind of apparatus. In the case of an optical disc apparatus, the optical storage medium is not an optical tape but an optical disc.

Figure 1A:
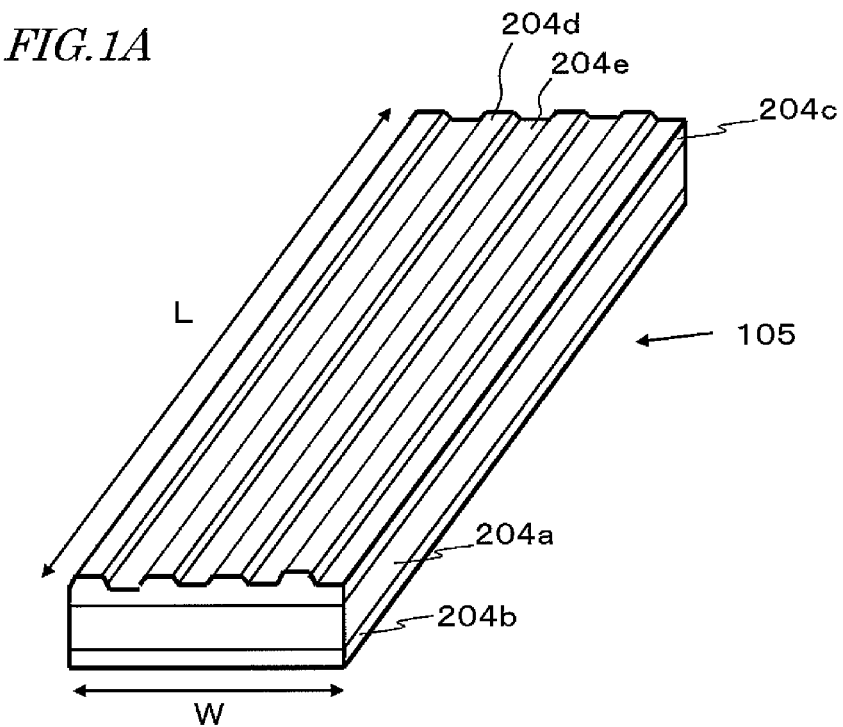
FIG. 1A is a perspective view schematically illustrating a portion of an optical tape 105 on a larger scale.

FIG. 1A is a perspective view schematically illustrating a portion of an optical tape 105 on a larger scale. The optical tape 105 may include a base film 204a, a back coating layer 204b that is adhered to the back surface of the base film 204a, and an imprint layer 204c that is supported by the base film 204a. On the upper surface of the imprint layer 204c, lands 204d and grooves 204e have been formed. Although not shown in FIG. 1A, a reflective film and a recording material film are deposited over the entire upper surface of the imprint layer 204c. The optical tape 105 is extended in the longitudinal direction L and may have a length of several hundred meters, for example. Its width W may be set within the range of a few millimeters to several centimeters, and its thickness may be within the range of a few micrometers to several ten micrometers.

It should be noted that FIG. 1A illustrating the optical tape 105 is not to scale. Actually, the optical tape 105 may have several hundreds, or an even greater number, of lands 204*d* and grooves 204*e*. In one embodiment, data is written on either the lands 204*d* or the grooves 204*e*. The lands 204*d* or the grooves 204*e* on which data is written will be referred to herein as "tracks", which may have a pitch of 0.2 μm to 0.4 μm, for example.

Figure 1B:
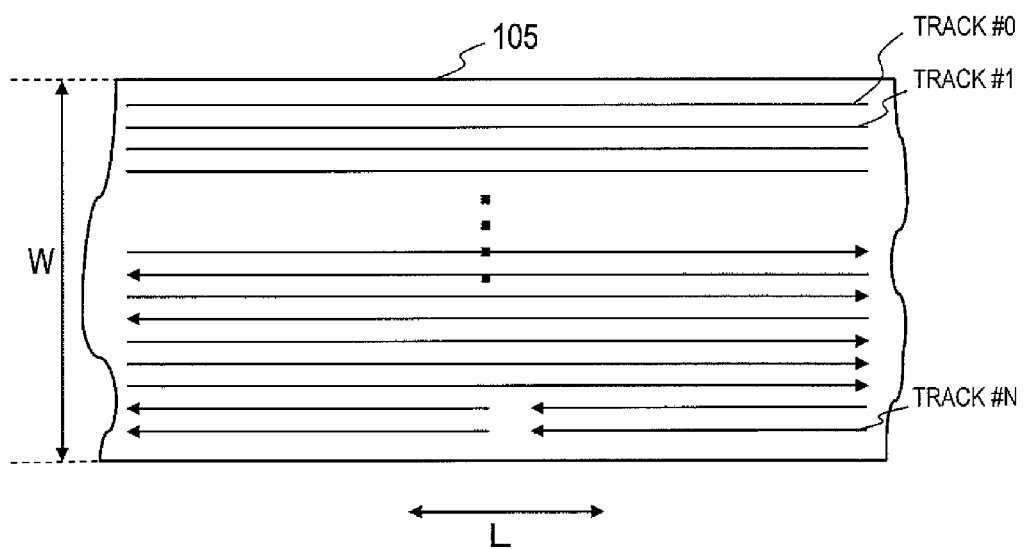
FIG. 1B is a plan view schematically illustrating a portion of the optical tape 105.

FIG. 1B is a plan view schematically illustrating a portion of the optical tape 105. As shown in FIG. 1B, N (which is an integer that is typically equal to or greater than 100) tracks #0 through #N have been formed to run in the longitudinal direction L. Some of those tracks shown in FIG. 1B are illustrated with an arrow. Each of those arrows indicates the direction in which data is written. That is to say, data can be written in multiple different directions on a single optical tape 105.

On the optical tape 105, a mark can be recorded optically by irradiating the tape 105 with a light beam. More specifically, such a mark is recorded on its recording material film. The light beam is radiated by an "optical pickup" that includes a light source and an objective lens that focuses the light beam emitted from the light source on the optical tape 105. When the optical pickup irradiates the optical tape 105 with a light beam, the irradiated portion of the optical tape 105 comes to have a different optical property such as a refractive index from the rest (i.e., the non-irradiated portion) of the optical tape 105. Such a portion, of which the optical property has changed in this manner, is called a "recorded mark".

In optical tape technologies, data can be read out from the optical tape 105 by irradiating the tape 105 with a relatively weak light beam with a constant intensity and detecting the light that has been modulated by, and reflected from, the optical tape 105. In writing data on the optical tape 105, data is written there by irradiating the optical tape 105 with a pulsed light beam, of which the optical power has been changed according to the data to be written, and locally changing the property of the recording material film.

When data is going to be written on the recording material film, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on the optical tape 105, the light beam always needs to maintain a predetermined converging state on a target track. For that purpose, a "focus control" and a "tracking control" is performed. The "focus control" means controlling the position of an objective lens along a normal to the surface (i.e., information storage layer) of the optical tape 105 so that the focal point (or at least the converging point) of the light beam is continuously located on the target track. On the other hand, the "tracking control" means controlling the position of the objective lens parallel to the information storage layer of the optical tape 105 and perpendicularly to the track so that the light beam spot is constantly located right on the target track.

In order to perform such a focus control or a tracking control, the focus error or the tracking error is detected based on the light that has been reflected from the optical tape 105 and the position of the light beam spot is adjusted so as to reduce the error as much as possible. The magnitudes of the focus error and the tracking error are respectively represented by a "focus error (FE) signal" and a "tracking error (TE) signal", both of which are generated based on the light that has been reflected from the optical tape 105.

Figure 2A:
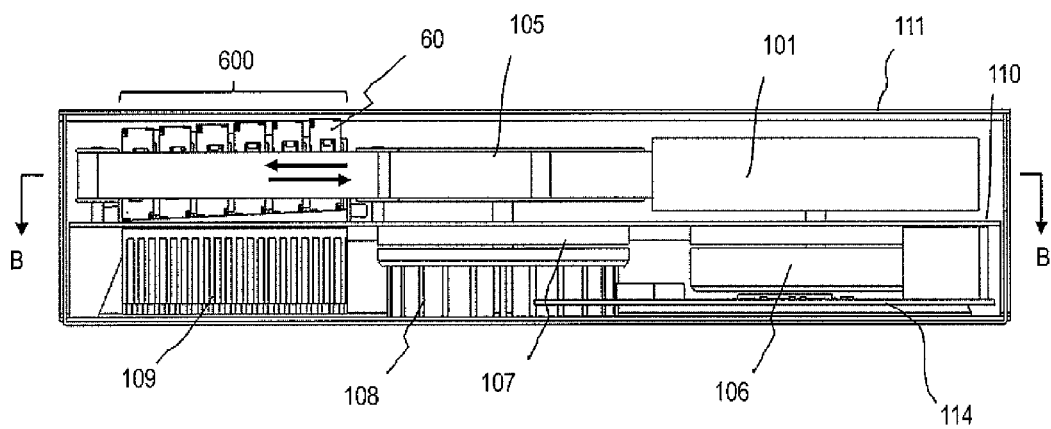
FIG. 2A illustrates an exemplary arrangement for an optical data streamer apparatus as a first embodiment of the present disclosure.
Figure 2B:
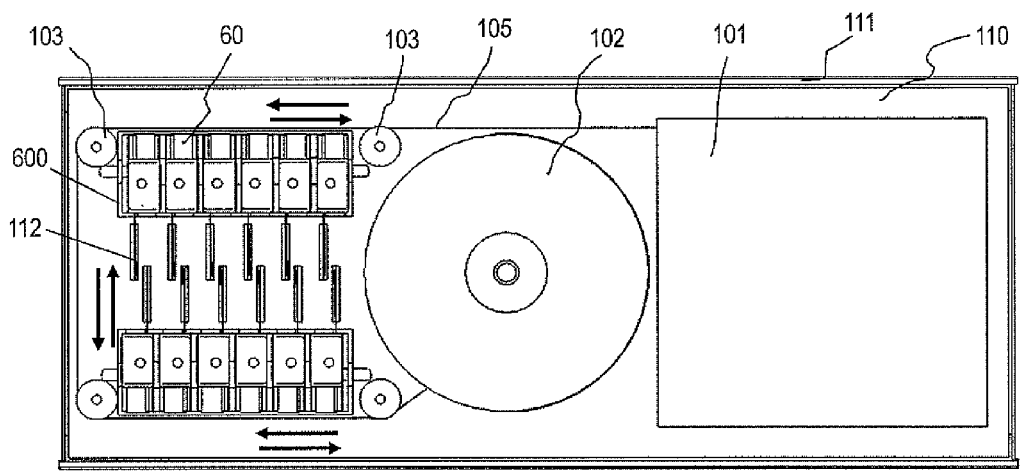
FIG. 2B is a cross-sectional view of the apparatus as viewed on the plane B-B shown in FIG. 2A.

FIG. 2A illustrates an exemplary arrangement for an optical data streamer apparatus as an embodiment of the present disclosure, and FIG. 2B is a cross-sectional view of the apparatus as viewed on the plane B-B shown in FIG. 2A. In the embodiment illustrated in FIG. 2A, the upside corresponds to perpendicularly upside, and the downside corresponds to perpendicularly downside. Thus, FIG. 2B illustrates an exemplary internal arrangement of this optical data streamer apparatus as viewed from right over the apparatus.

FIGS. 2A and 2B illustrate a situation where the apparatus is loaded with a tape cartridge 101 in which the optical tape 105 is housed. The tape cartridge 101 is readily attachable and removable to/from the apparatus. And the optical data streamer apparatus shown in FIGS. 2A and 2B is loaded with a selected one of multiple tape cartridges 101 that have the same shape.

The optical data streamer apparatus of this embodiment includes a housing 111, a chassis 110 that is arranged inside of the housing 111, a plurality of pickup parts 60 that are arranged so as to write data on the optical tape 105, and a radiator 109. Those pickup parts 60 are positioned by a positioning mechanism provided for an optical pickup assembly 600.

More specifically, this optical data streamer apparatus includes motors 106 and 107 that make the optical tape 105 run, guide posts 103 and a winding spool 102. The motor 107 is mechanically interlocked with the winding spool 102 and turns the winding spool 102. On the other hand, the motor 106 is mechanically interlocked with the shaft of the tape cartridge 101 loaded and operates so as to wind the tape 105, which has been pulled out of the tape cartridge 101, back to the tape cartridge 101. Using these two motors 106 and 107, the tape 105 can run in both of the two directions that are indicated by the arrows.

The optical pickup assembly 600 includes a number of pickup parts 60, which are arranged in the direction in which the optical tape 105 runs. The optical pickup assembly 600 of this embodiment has upper and lower arrays of pickup parts 60. In the housing 111, arranged is a blower fan 108 that is mechanically coupled to the motor 107. That is why as the motor 107 turns, the blower fan 108 turns, too.

Each pickup part 60 has a single or multiple optical pickups. The configuration of each optical pickup will be described in detail later. The pickup parts 60 are connected to flexible printed circuit boards (FPCs) 112 for optical pickups. This optical data streamer apparatus further includes a circuit board (not shown) that is connected to the flexible printed circuit boards 112 and that includes circuit components that control the pickup parts 60 and the motors 106 and 107. Optionally, the pickup parts 60 and a circuit that would normally be mounted on another circuit board could be partially arranged on the flexible printed circuit boards 112.

Hereinafter, an exemplary circuit configuration for an optical data streamer apparatus according to this embodiment will be described with reference to FIG. 3.

Figure 3:
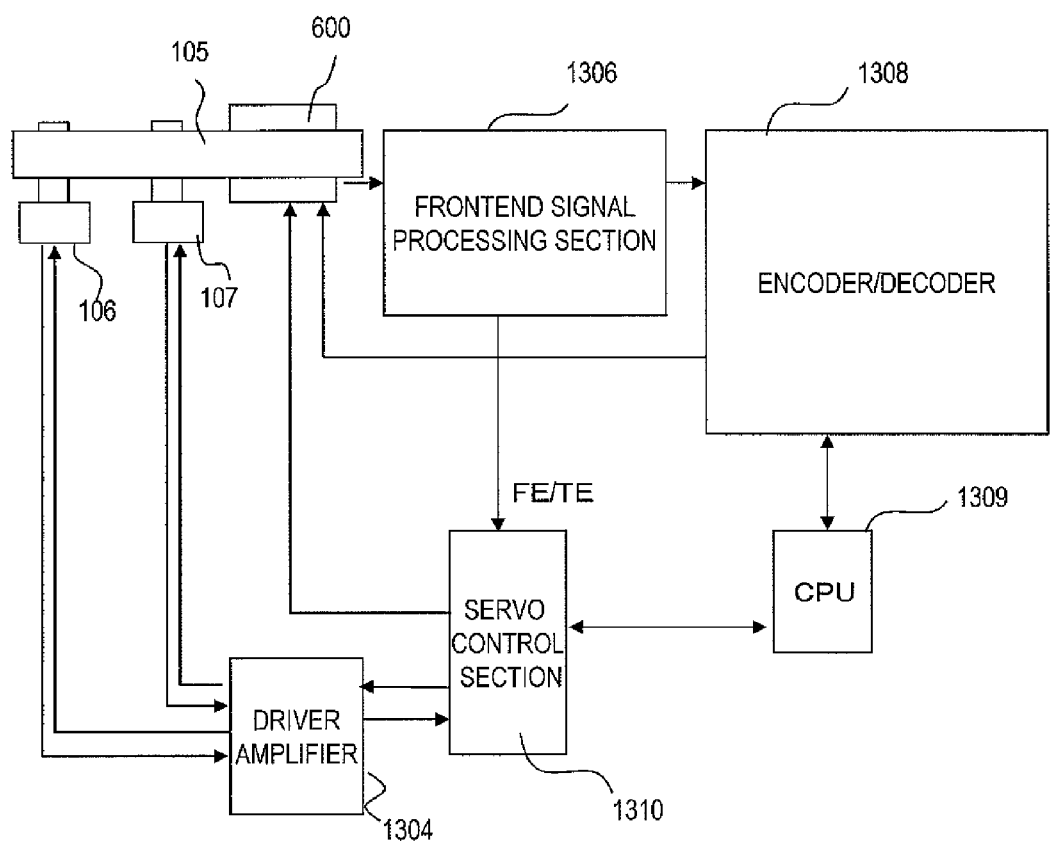
FIG. 3 illustrates an exemplary circuit configuration for an optical data streamer apparatus according to the first embodiment of the present disclosure.

The optical data streamer apparatus illustrated in FIG. 3 includes circuit blocks that are electrically connected to the optical pickup assembly 600 and motors 106 and 107.

In the exemplary configuration shown in FIG. 3, the output of the optical pickup assembly 600 is supplied to an encoder/decoder 1308 by way of a frontend signal processing section 1306. In reading data, the encoder/decoder 1308 decodes the data that is stored on the optical tape 105 based on the signal that has been generated by the optical pickup assembly 600. In writing data, on the other hand, the encoder/decoder 1308 encodes the data to generate a signal to be written on the optical tape 105 and outputs the signal to the optical pickup assembly 600.

The frontend signal processing section 1306 generates a read signal based on the output of the optical pickup assembly 600, and also generates a focus error signal FE and a tracking error signal TE. The focus error signal FE and the tracking error signal TE are then supplied to a servo control section 1310. In response, the servo control section 1310 gets the motors 106 and 107 controlled by a driver amplifier 1304. The servo control section 1310 also gets the position of an objective lens controlled by a lens actuator in the optical pickup assembly 600. The encoder/decoder 1308, the servo control section 1310 and all the other components are controlled by a CPU 1309. The blocks illustrated in FIG. 3 can be implemented by assembling together integrated circuit elements, memories and other electronic parts on a circuit board.

The storage layer of the optical tape 105 that can be used in this embodiment may have a width of about 10 mm, for example. In that case, data can be read and written from/on the running optical tape 105 over the entire width of the storage layer thereof by twenty-four optical pickups, for example.

Before the tape cartridge 101 is loaded into this optical data streamer apparatus, the optical tape 105 housed in the tape cartridge 101 has been wound around a spool (not shown). And when the tape cartridge 101 is loaded into the optical data streamer apparatus, the optical tape 105 is pulled out while being guided by a number of tape guide posts 103 and then wound around the winding spool 102. Each of the pickup parts 60 is fixed at a predetermined position with respect to the optical tape 105 so as to read and write information from/on the optical tape 105. In this embodiment, twenty-four optical pickups are provided, and therefore, data can be read and written simultaneously by using a maximum of twenty-four optical pickups. It should be noted that the number of optical pickups provided for a single optical data streamer apparatus does not have to be, and may be greater or smaller than, twenty-four.

The feed motor 107 drives and turns the winding spool 102, thereby running the optical tape 105 in the forward direction. At the same time, the feed motor 107 also drives the blower fan 108. On the other hand, the reverse motor 106 drives and turns a spool (not shown) in the tape cartridge 101, thereby running the optical tape 105 in the reverse direction. In the meantime, as the winding spool 102 is also driven by the optical tape 105, the blower fan 108 is turned, too. As the pickup parts 60 are thermally coupled to the radiator 109, the heat generated by the pickup parts 60 is transferred to the radiator 109.

During reading or writing, the optical tape 105 is run either in the forward direction by the feed motor 107 or in the reverse direction by the reverse motor 106, while those optical pickups can perform a read/write operation on the optical tape 105 at the same time.

Hereinafter, the arrangement of an optical system for use in this embodiment will be described.

Figure 4:
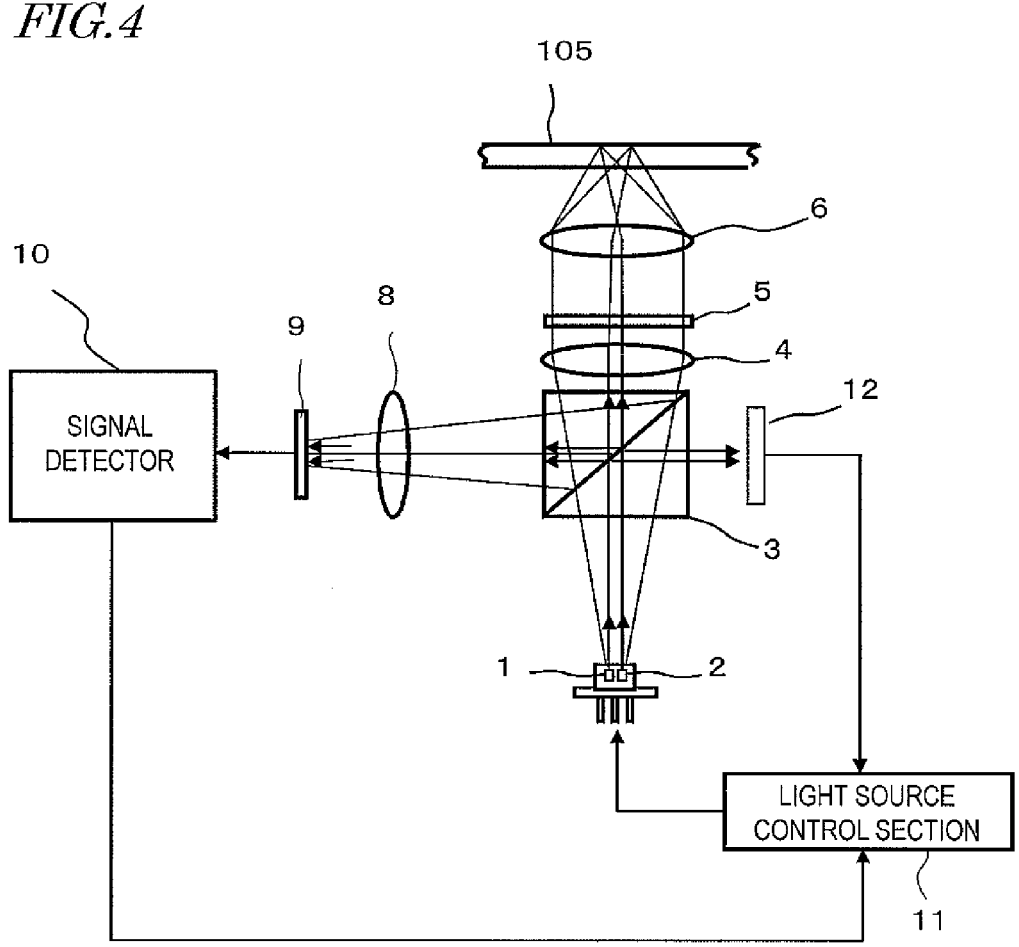
FIG. 4 illustrates an arrangement for an optical read/write apparatus according to the first embodiment of the present disclosure.

FIG. 4 illustrates an arrangement of an optical system for an optical read/write apparatus according to this embodiment.

First of all, a general arrangement for this optical read/write apparatus will be described. The optical read/write apparatus shown in FIG. 4 includes first and second light sources 1, 2 and an optical system that converges a write beam and a read beam, which have been emitted from the first and second light sources 1 and 2, respectively, on the optical tape 105. This optical system converges the write and read beams onto the optical tape 105 so that the same location on the optical tape 105 is scanned with the write beam before being scanned with the read beam.

An optical read/write apparatus according to this embodiment includes a signal detector 10 which senses the write and read beams that have been reflected from the optical tape 105 and which generates electrical signals, a power monitoring detector 12 which monitors the optical powers of the first and second light sources 1 and 2, and a light source control section 11 which controls the optical powers of the first and second light sources 1 and 2 and which modulates the optical power of the first light source 1 so that a signal mark is recorded on the optical tape 105 with the write beam.

In an optical power control range in which writing user data on the optical tape 105 is temporarily suspended, the light source control section 11 writes non-user data on the optical tape 105 and stops the second light source 2 from emitting the light beam while writing the non-user data. Meanwhile, the power monitoring detector 12 obtains optical power information of the first light source 1 while stopping the second light source 2 from emitting the light beam.

In this description, the "non-user data" includes address data (address information), sync signals, test marks and markers. The address data carries information about a location on a track. The sync signals may be used to generate an internal clock for the signal detector 10 according to the rate of scanning the optical tape 105. As for an optical tape 105 on which neither address data nor sync signals have been stored in advance (i.e., a non-preformatted optical storage medium), it will be efficient to write address data and/or sync signals on the optical tape 105 while the optical tape 105 is being run to write user data on. This is because in order to write address data and/or sync signals on the optical tape 105 before writing user data on it, it should take a while to run the long optical tape 105 for that purpose only. The test marks are marks that are used to perform a test write operation in order to optimize the optical power of the write beam. On the other hand, the markers are marks (or blanks) that can be detected even when the optical tape 105 is run at higher speeds than in a normal read operation. By arranging the markers either at regular intervals or before and after the address data, target address or user data can be accessed more quickly.

As shown in FIG. 4, most of the light that has been emitted from the light sources 1 and 2 is transmitted through a polarization beam splitter 3, and transformed into substantially parallel light beams through a collimator lens 4. The parallel light beams are turned into circularly polarized light beams through a wave plate 5, and then condensed by an objective lens 6, thereby forming condensed light beam spots on the information storage layer of the optical tape 105. In the following description, the light beam emitted from the light source 1 and the condensed light beam spot left by that light beam will be referred to herein as a "main beam" and a "main spot", respectively, and the light beam emitted from the light source 2 and the condensed light beam spot left by that light beam will be referred to herein as a "sub-beam" and a "sub-spot", respectively. It should be noted that these optical elements are arranged so that the main spot passes through the same location on the optical tape 105 before the sub-spot does as described above.

The light that has been reflected from the optical tape 105 is transmitted through the objective lens 6 and the wave plate 5 and turned into plane polarized light beams, of which the polarization direction intersects with that of the light beams on the way toward the optical tape 105. After that, the plane polarized light beams that have left the wave plate 5 are reflected from the polarization beam splitter 3, given astigmatism by a detector lens 8, and then incident on a detector 9.

Figure 5:
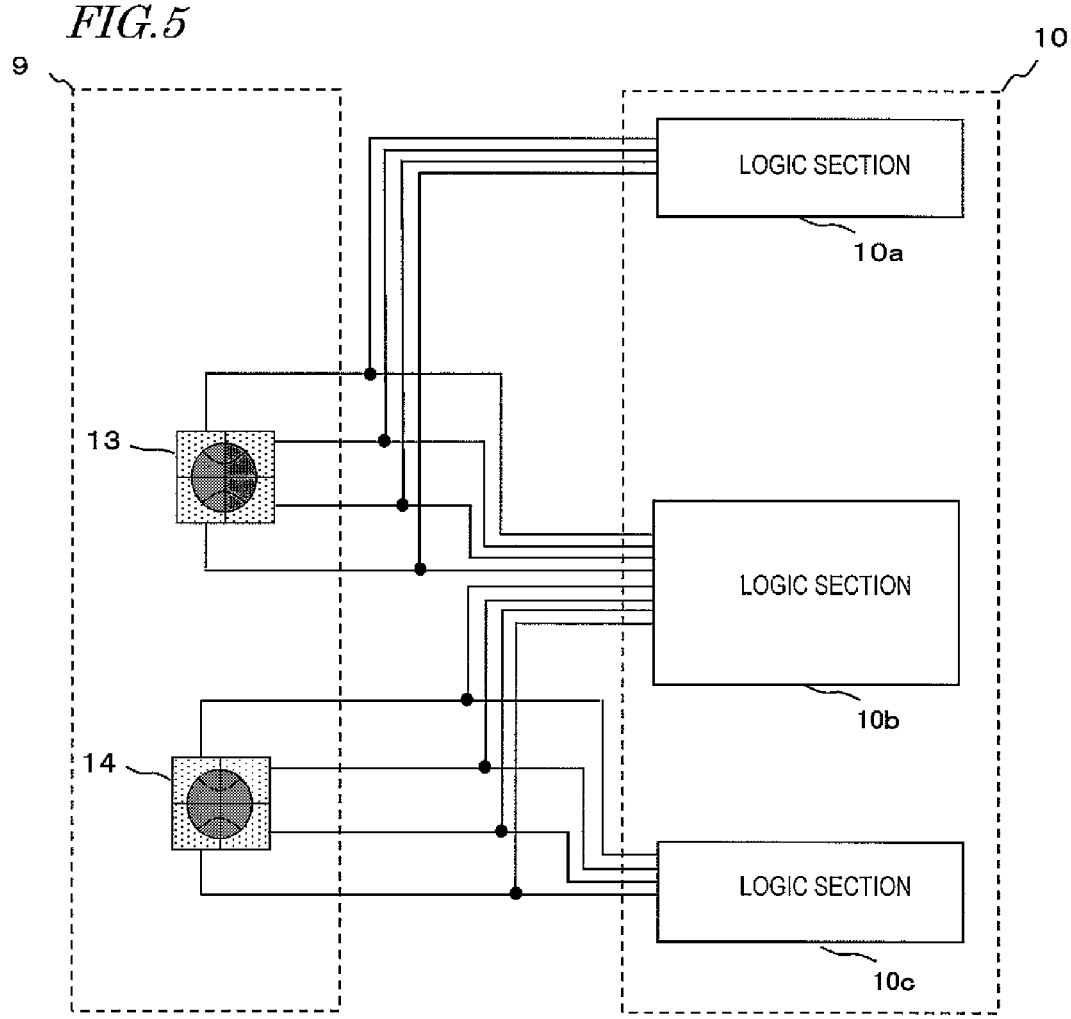
FIG. 5 illustrates a configuration for detecting a signal according to the first embodiment of the present disclosure.

FIG. 5 is a block diagram illustrating the main beam detecting section 13 and sub-beam detecting section 14 of the detector 9 and the signal detector 10. The light beams incident on the main beam detecting section 13 and the sub-beam detecting section 14 are used by logic sections 10a through 10c of the signal detector 10 to generate not only read signals representing the main and two sub-spots, respectively, but also focus and tracking control signals for the main and sub-spots as well. However, as the focus and tracking control signals and recorded mark signals can be detected by known methods, description thereof will be omitted herein.

Meanwhile, part of the light beams that have been emitted from the light sources 1 and 2 and then reflected from the polarization beam splitter 3 is incident on a power monitoring detector 12. A monitor signal is generated by the power monitoring detector 12 and then sent to the light source control section 11 to perform an optical modulation control on the main beam to record marks on the optical tape 105. On the other hand, a sub-beam read power control is performed using sub-spot read signal information that has been obtained by the signal detector 10.

Figure 6:
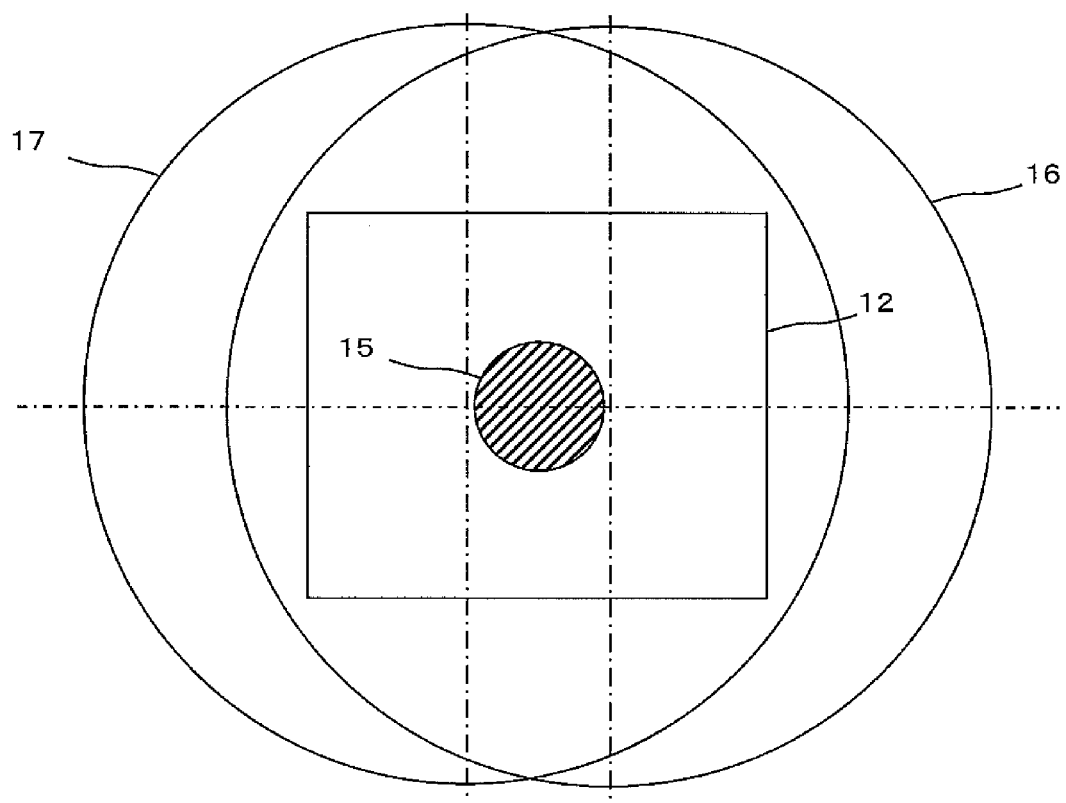
FIG. 6 illustrates a power monitoring detector according to the first embodiment of the present disclosure.

FIG. 6 illustrates the power monitoring detector 12 as viewed from the polarization beam splitter 3. The light beams 16 and 17 that have been emitted from the light sources 1 and 2 are incident on a photodiode 15 of the power monitoring detector 12 while being superposed one upon the other.

Portion (a) of FIG. 7 illustrates the storage state at a certain location on the optical tape 105 and portion (b) of FIG. 7 illustrates the states of main and sub-spots when that location is scanned. Specifically, portion (a) of FIG. 7 illustrates a portion of a single track including one optical power control range Tc and user data storage areas that interpose the optical power control range Tc. In this example, the optical tape 105 is running in the direction indicated by the arrow V shown in FIG. 7. Each light beam spot formed on the optical tape 105 moves in the direction that is opposite to the one indicated by the arrow V (i.e., to the right on the paper) if the optical tape 105 is supposed to be not moving but fixed. Portion (b) of FIG. 7 schematically illustrates how the light beam spots formed on the track of the optical tape 105 shown in portion (a) of FIG. 7 move on the track with time. Portion (b) of FIG. 7 illustrates how the light beam spots move on the supposition that the optical tape 105 is fixed for convenience sake. The shaded circles shown in portion (b) of FIG. 7 indicate the positions of the main and sub-spots M and S. Also, in portion (b) of FIG. 7, the time axis runs vertically downward. As the time passes, the main spot M or the sub-spot S moves on the optical tape 105 to the right. This is because the optical tape 105 is running to the left. The same can be said about any of FIGS. 11, 13, 16 and 17 to be referred to later.

First of all, before a time t1, a DRAW operation is performed with the light sources 1 and 2 of the main and sub-spots M and S both turned ON so that user data is written with the main spot and that a mark that has just been recorded is read with the sub-spot. Before the time t1 shown in portion (b) of FIG. 7, two circles are drawn with a line segment interposed between them. Those two circles indicate the sub-spot S and the main spot M, respectively. The sub- and main spots S and M move to the right on the paper as the time passes.

Next, at the point in time t1, the light source 2 of the sub-spot S is turned OFF, user data stops being written with the main spot M, and non-user data starts to be written instead. The period from the time t1 through a time t2, the non-user data continues to be written with the light source 2 of the sub-spot S still turned OFF. And at the point in time t2, the light source 2 of the sub-spot S is turned ON again and user data starts to be written again with the main spot M.

In this case, the period from t1 through t2 corresponds to the optical power control range Tc in which writing the user data on the optical tape 105 is temporarily suspended. In the example illustrated in FIG. 7, the output monitor information of the light source 1 is obtained from this optical power control range Tc. A range from which the output monitor information of the light source 1 is obtained will be identified herein by Tc1. Although Tc1=Tc is satisfied in the example illustrated in FIG. 7, it is recommended that Tc1≤Tc be satisfied to say the least.

In portion (a) of FIG. 7, "enabled" means that the DRAW operation may be performed in that range.

Portions (a), (b) and (c) of FIG. 8 show how the respective optical powers of the main and sub-beams and the output of the power monitoring detector 12 change with time in such a situation. Specifically, portion (a) of FIG. 8 shows a waveform in which the optical power changes between the three levels of a bottom level Pb, a bias level (i.e., erase level) Pe and a peak level (i.e., write level) Pw with respect to a zero level P0 (i.e., the waveform of a modulated signal supplied from the light source 1). To record a single mark, a train of multiple optical pulses at the peak level is used. As shown in portion (a) of FIG. 8, in the write mode, the optical power of the main beam is modulated but the optical power of the sub-beam is kept constant at a read level. The optical power of the main beam may be modulated in accordance with the "write strategy" which is adopted in the DVD or Blu-ray Disc technologies. The optical power of the main beam changes between those three levels in this example but may also change between only two levels. The modulated signal supplied from the light source 1 may be a rectangular wave with at least two values. The light source 1 may be modulated by an optical power control section for the light source 1 in the light source control section 11 shown in FIG. 4.

In the period from t1 through t2, corresponding to the optical power control range, the light source 2 of the sub-beam is in OFF state, and therefore, only the main beam component is output from the power monitoring detector 12. In this case, in the period from t1 through t2, the power monitor information of the main beam is obtained and the optical power of the main beam is controlled by reference to that information obtained. As described above, it would be efficient to write address data or sync signals on the optical power control range particularly when an optical storage medium on which no such data or signals have been written is used.

FIG. 26A shows an exemplary waveform of a read signal in a situation where sync signals are written on the optical power control range. FIG. 26B shows an exemplary waveform of a read signal in a situation where address data is written on the optical power control range. And FIG. 26C shows an exemplary waveform of a read signal in a situation where address data and sync signals are both written on the optical power control range. As can be seen from these drawings, the sync signals have a waveform that oscillates regularly in a constant period.

FIG. 9 is a block diagram illustrating an optical power control section for the light source 1 in the light source control section 11. The monitor signal is input to three sample-and-hold circuits (which will be referred to herein as "SH circuits") 18, 19 and 20. At respective times when the optical power of the main beam output by a sample-and-hold timing generating block (which will be referred to herein as "SH timing generator") 21 is at the bottom level (Pb level), the bias level (Pe level) and the peak level (Pw level), the sample-and-hold circuits 18, 19 and 20 are turned ON to obtain the monitor signals at the respective levels. Current drivers 28, 29 and 30 for the light source 1 are controlled so that the monitor signals at the respective levels that have been obtained through differential amplifiers 22, 23 and 24 agree with their respective target values, namely, a bottom level target value (Pb level target value) 25, a bias level target value (Pe level target value) 26 and a peak level target value (Pw level target value) 27. In this case, the opened or closed states of switches 31, 32 and 33 are controlled by a laser drive output timing generating block 34, which may operate based on the output signal of the encoder/decoder 1308 shown in FIG. 3, for example. By turning these switches 31, 32 and 33, the optical power of the light source 1 (i.e., the optical power of the main beam) may be modulated as shown in portion (a) of FIG. 8, for example. Thanks to the action of the laser drive output timing generating block 34, various marks can be recorded on the optical tape 105 with the main beam. As a result, not only the user data but also the address data and sync signals can also be written on the optical tape 105.

Among the respective components of this light source control section 11, the current drivers 28, 29 and 30, the switches 31, 32 and 33, and the timing generating block 34 may be provided in the optical pickup. On the other hand, the sample-and-hold circuits 18, 19 and 20 and the differential amplifiers 22, 23 and 24 may be provided outside of the optical pickup (e.g., in the servo control section 1310 shown in FIG. 3).

Meanwhile, the light source 2 can have its optical power controlled by getting the sub-beam read signal, supplied from the logic section 10c of the signal detector 10, detected by a wave detector 36 and by driving a current driver 39 so that the read signal can have its amplitude amplified to the target one 38 by a differential amplifier 37 as shown in FIG. 10.

By adopting such a configuration, even if light beams emitted from multiple light sources that are arranged close to each other are incident on the power monitoring detector 12 so as to be superposed one upon the other, the optical power of each light source can also be controlled.

In FIG. 7, the user data and non-user data that have been written on the track are illustrated as being adjacent to each other. Optionally, an unrecorded (or blank) area may be left as a marker either between the user data and the non-user data or between the non-user data.

Also, if data or a signal other than address data is written as the non-user data, then address data may be written between user data and non-user data as shown in FIG. 11. By making the optical power control range and the address data range continuous with each other in this manner, the user data stored is suspended at fewer positions, and the data structure of the optical storage medium can be simplified. Or if no DRAW operation needs to be performed on address data, then such address data may be written as non-user data as described above. In the example illustrated in FIG. 11, the address data is supposed to be written after the non-user data has been written and before the user data starts to be written again. However, the address data may also be written after the user data has stopped being written and before the non-user data starts to be written.

If a data arrangement such as the one shown in FIG. 7 is adopted and if the interval between the main and sub-spots M and S is shorter than the length of the non-user data range Tc, the DRAW operation can be performed on the non-user data that has been written after the non-user data has been written and before the sub-spot S passes through the non-user data area (i.e., in the interval between t2 and t3). That is why data can be stored efficiently by writing the address data in that interval.

Furthermore, let us consider how often such a power monitoring signal needs to be obtained to control the optical power. In a semiconductor laser diode, which is generally used as a light source, the relation between the drive current and the optical power often varies with the temperature. That is why it would be beneficial to obtain the power monitoring signal periodically and make feedback to control the optical power every time the signal is obtained. In that case, however, the user data needs to stop being written temporarily. Therefore, it is recommended that the power monitoring signal not be obtained too frequently to leave enough space for the overall user data. Let us consider specifically how long the period T at which the power monitoring signal is obtained needs to be compared to the interval t between t1 and t2. In general, when an automatic power control (APC) is carried out on a laser diode, the control is supposed to be carried out within the range of a few kHz through several ten kHz. By covering this range, the temperature dependence of the optical power of the laser diode can be reduced sufficiently and the optical power can be obtained with good stability. In addition, there will be plenty of control circuits to choose from in that case. Also, since it will take a few milliseconds to get the optical power settled in such a situation, it is appropriate to set the period T to be longer than that. Nevertheless, if the period T were too long, then the temperature dependence of the optical power of the laser diode could not be controlled. For that reason, the period T suitably falls within the range of a few ten ms through several hundred ms. Thus, supposing T is 50 ms in this example, let us consider how large the t value needs to be to strike an adequate balance between a practical length of time to get the monitoring data and permissible loss of user data. Considering the frequencies of occurrence of respective levels on a write beam modulated waveform and the sampling accuracy in an optical read/write system that is currently generally used for DVDs and Blu-ray Discs, the t value is supposed to be 500 μs, for example. This is a practical value that is large enough to sample the respective levels of the write beam modulated waveform in those DVD or Blu-ray Disc systems. In that case, user data would be lost for 500 μs out of 50 ms, and therefore, the user data loss time would account for 1% of the overall t time, and can be said to be a sufficiently practical value. In this example, T/t is 100. However, as long as the system permits, the value may be set to be greater than 100 so as to further reduce the user data loss.

Embodiment 2

FIG. 12 illustrates an arrangement of an optical system for an optical read/write apparatus according to a second embodiment of the present disclosure.

As shown in FIG. 12, most of the light that has been emitted from the light sources 1 and 2 is transmitted through the polarization beam splitter 3, and transformed into substantially parallel light beams through the collimator lens 4. The parallel light beams are turned into circularly polarized light beams through the wave plate 5, and then condensed by the objective lens 6, thereby forming condensed light beam spots on the information storage layer of the optical tape 105. In the following description, the light beam emitted from the light source 1 and the condensed light beam spot left by that light beam will be referred to herein as a "main beam" and a "main spot", respectively, and the light beam emitted from the light source 2 and the condensed light beam spot left by that light beam will be referred to herein as a "sub-beam" and a "sub-spot", respectively. It should be noted that these optical elements are arranged so that the main spot passes through the same location on the optical tape 105 before the sub-spot does.

The light that has been reflected from the optical tape 105 is transmitted through the objective lens 6 and the wave plate 5 and turned into plane polarized light beams, of which the polarization direction intersects with that of the light beams on the way toward the optical tape 105. After that, the plane polarized light beams that have left the wave plate 5 are reflected from the polarization beam splitter 3, given astigmatism by a detector lens 8, and then incident on a detector 9. FIG. 5 is a block diagram illustrating the main beam detecting section 13 and sub-beam detecting section 14 of the detector 9 and the signal detector 10. The light beams incident on the main beam detecting section 13 and the sub-beam detecting section 14 are used as not only read signals representing the main and two sub-spots, respectively, but also focus and tracking control signals for the main and sub-spots as well. However, as the focus and tracking control signals and recorded mark signals can be detected by known methods, description thereof will be omitted herein.

Meanwhile, part of the light beams that have been emitted from the light sources 1 and 2 and then reflected from the polarization beam splitter 3 is incident on the power monitoring detector 12. A monitor signal is generated by the power monitoring detector 12 and then sent to the light source control section 11 to control the optical powers of the light sources 1 and 2. The light beams that have been emitted from the light sources 1 and 2 are incident on the power monitoring detector 12 so as to be superposed one upon the other.

Portion (a) of FIG. 13 illustrates the storage state at a certain location on the optical tape 105 and portion (b) of FIG. 13 illustrates the states of main and sub-spots M and S when that location is scanned.

First of all, before a time t1, a DRAW operation is performed with the light sources 1 and 2 of the main and sub-spots both turned ON so that user data is written with the main spot M and that a mark that has just been recorded is read with the sub-spot S. Next, at the point in time t1, the light source 2 of the sub-spot S is turned OFF, user data stops being written with the main spot M, and the non-user data described above starts to be written instead. In the period from the time t1 through a time t2, the non-user data continues to be written with the light source 2 of the sub-spot S still turned OFF. And at the point in time t2, the light source 1 of the main spot M is turned OFF this time and the light source 2 of the sub-spot S is turned ON again. That is why an "unrecorded portion" begins from the location of the main spot M at the point in time t2. The sub-spot S arrives at the beginning of the unrecorded portion at a point in time t3. Then, at a point in time t4, the light source 1 of the main spot M is turned ON again and user data starts to be written again. In this case, the period from t1 through t2 corresponds to the range Tc1 from which the power monitor information of the main beam is obtained.

Portions (a), (b) and (c) of FIG. 14 show how the respective optical powers of the main and sub-beams and the output of the power monitoring detector change with time in such a situation. In the period from t1 through t2, the light source 2 of the sub-beam is in OFF state, and therefore, only the main beam component is output from the power monitoring detector. In this case, in the period from t1 through t2, the power monitor information of the main beam is obtained and the optical power of the main beam is controlled by reference to that information obtained. On the other hand, in the period from t2 through t4, the light source 1 of the main beam is in OFF state and the light source 2 of the sub-beam is in ON state to the contrary. Thus, in the period from t2 through t4, the power monitor information of the sub-beam is obtained and the optical power of the sub-beam is controlled by reference to that information obtained. That is to say, the period from t2 through t4 corresponds to the range Tc2 to obtain the power monitor information of the sub-beam from. In this example, the range Tc1 to obtain the power monitor information of the main beam from and the range Tc2 to obtain the power monitor information of the sub-beam from are both included in the optical power control range Tc.

As in the first embodiment described above, the optical power of the light source 1 may also be controlled according to this embodiment by the light source control section 11 shown in FIG. 9. The monitor signal is input to the three sample-and-hold circuits 18, 19 and 20. At respective times when the optical power of the main beam is at the bottom level (Pb level), the bias level (Pe level) and the peak level (Pw level), the sample-and-hold circuits (SH circuits) 18, 19 and 20 are turned ON to obtain the monitor signals at the respective levels. Current drivers for the light source 1 are controlled so that the monitor signals at the respective levels that have been obtained agree with their respective target values.

As for the light source 2, on the other hand, the power monitoring signal in the period from t2 through t4 is obtained by using the circuit blocks in the light source control section 11 shown in FIG. 15 and the optical power of the sub-beam is controlled by reference to the information thus obtained.

By adopting such a configuration, even if light beams emitted from multiple light sources that are arranged close to each other are incident on the power monitoring detector 12 so as to be superposed one upon the other, the optical power of each light source can also be controlled. On top of that, according to this configuration, the power monitoring signals of the main and sub-beams can both be obtained, and therefore, the optical power can be controlled even more precisely and with even more stability.

In addition, as the optical power control range includes a range in which the main beam is turned OFF, an unrecorded area will be left, which can be used effectively as a marker indicating that writing of user data has been suspended.

It should be noted that the output monitor information of the light sources 1 and 2 does not always have to be obtained continuously with the sub-beam turned OFF and with the main beam turned OFF, respectively. However, to stop writing the user data for as short an interval as possible, it is still effective to get those kinds of information continuously.

In FIG. 13, the user data and non-user data are illustrated as being adjacent to each other just before the optical power control range. Optionally, an unrecorded (or blank) area may be left as a marker either between the user data and the non-user data or between the non-user data.

Optionally, the address data may be written right after the optical power control range Tc as shown in FIG. 16. By making the optical power control range Tc and the address data range continuous with each other in this manner, the user data stored is suspended at fewer positions, and the data structure of the optical storage medium can be simplified. Or if no DRAW operation needs to be performed on address data, then such address data may be written as non-user data. In the example illustrated in FIG. 16, the address data is supposed to be written after the unrecorded area has been passed and before the user data starts to be written again. However, the address data may also be written after the user data has stopped being written and before the non-user data starts to be written.

If a data arrangement such as the one shown in FIG. 16 is adopted and if the interval between the main and sub-spots is shorter than the length of the non-user data range, the DRAW operation can be performed on the non-user data that has been written after the non-user data has been written and before the sub-spot passes through the non-user data area (i.e., in the interval between t2 and t3). That is why data can be stored efficiently by writing the address data in that interval.

Still alternatively, in the optical power control range, the sub-beam's power monitor information may be obtained with the main beam's light source 1 turned OFF first, and then the main beam's power monitor information may be obtained with the main beam's light source 1 turned ON and with the sub-beam's light source 2 tuned OFF as shown in FIG. 17. If sync signals are written as the non-user data, synchronization can be achieved when the address data starts to be written after the optical power control range Tc and when the DRAW operation starts to be performed again on the user data by adopting such an arrangement. Even so, if the interval between the main and sub-spots is shorter than the length of the non-user data range, the DRAW operation can be performed in the interval between t3 and t4.

Also, even in this example, by setting the period T in which the power monitoring signal is obtained and the interval t between t1 and t4 so as to satisfy $T/t \geq 100$, the user data loss can be reduced to a practical level.

Embodiment 3

Hereinafter, an optical read/write apparatus as a third embodiment of the present disclosure will be described.

The optical system of this embodiment also has the arrangement shown in FIG. 12. As shown in FIG. 12, most of the light that has been emitted from the light sources 1 and 2 is transmitted through the polarization beam splitter 3, and transformed into substantially parallel light beams through the collimator lens 4. The parallel light beams are turned into circularly polarized light beams through the wave plate 5, and then condensed by the objective lens 6, thereby forming condensed light beam spots on the information storage layer of the optical tape 105. In the following description, the light beam emitted from the light source 1 and the condensed light beam spot left by that light beam will be referred to herein as a "main beam" and a "main spot", respectively, and the light beam emitted from the light source 2 and the condensed light beam spot left by that light beam will be referred to herein as a "sub-beam" and a "sub-spot", respectively. It should be noted that these optical elements are arranged so that the main spot passes through the same location on the optical tape 105 before the sub-spot does.

The light that has been reflected from the optical tape 105 is transmitted through the objective lens 6 and the wave plate 5 and turned into plane polarized light beams, of which the polarization direction intersects with that of the light beams on the way toward the optical tape 105. After that, the plane polarized light beams that have left the wave plate 5 are reflected from the polarization beam splitter 3, given astigmatism by the detector lens 8, and then incident on the detector 9. FIG. 5 is a block diagram illustrating the main beam detecting section 13 and sub-beam detecting section 14 of the detector 9 and the signal detector 10. The light beams incident on the main beam detecting section 13 and the sub-beam detecting section 14 are used as not only read signals representing the main and two sub-spots, respectively, but also focus and tracking control signals for the main and sub-spots as well. However, as the focus and tracking control signals and recorded mark signals can be detected by known methods, description thereof will be omitted herein.

Meanwhile, part of the light beams that have been emitted from the light sources 1 and 2 and then reflected from the polarization beam splitter 3 is incident on the power monitoring detector 12. A monitor signal is generated by the power monitoring detector 12 and then sent to the light source control section 11 to control the optical powers of the light sources 1 and 2. The light beams that have been emitted from the light sources 1 and 2 are incident on the power monitoring detector 12 so as to be superposed one upon the other.

Portions (a) and (b) of FIG. 18 respectively show how the optical powers of the main and sub-beams change with time during a write operation. By changing the output levels of the main beam between the three level of bottom, bias and peak levels (i.e., Pb, Pe and Pw levels) with time at short intervals, marks with various different lengths are recorded on the optical storage medium. On the other hand, the optical power of the sub-beam is controlled at the fixed output of the read level. In this manner, the monitor output of the power monitoring detector 12 when the main beam's light source 1 and the sub-beam's light source 2 are emitting light beams becomes the sum of the respective waveforms of the main and sub-beams as shown in portion (c) of FIG. 18. And the monitor signal thus obtained is sent to the light source control section 11.

As in the first embodiment described above, the optical power of the light source 1 may also be controlled in this embodiment by the light source control section 11 shown in FIG. 9. The monitor signal is input to the sample-and-hold circuits 18, 19 and 20. At respective times when the optical power of the main beam is at the bottom level (Pb level), the bias level (Pe level) and the peak level (Pw level), the sample-and-hold circuits 18, 19 and 20 are turned ON to obtain the monitor signals at the respective levels. Current drivers for the light source 1 are controlled so that the monitor signals at the respective levels agree with their respective target values. In this case, since the sub-beam component has been added uniformly to the monitor signal at each level, the sub-beam component needs to be subtracted from each target value. And the quantity to subtract may be stored in advance in the apparatus.

On the other hand, at a timing when the optical power of the light source 2 is at the bottom level (Pb level), the sample-and-hold circuit 40 is turned ON, thereby obtaining a monitor signal at the bottom level (Pb level). The current driver for the light source 2 is controlled so that the monitor signal thus obtained agrees with the target value. In this case, since the main-beam component has been added to the monitor signal, the main-beam component needs to be subtracted from the target value. And the quantity to subtract may be stored in advance in the apparatus.

The timing to sample and hold may be defined by a write modulated signal that has been generated either inside of the light source control section 11 or by an arithmetic processing block (not shown) of the optical read/write apparatus. In general, a write modulated waveform may be generated by adding together selected ones of the respective channels' output signals at the read, bottom, bias and peak levels.

Since a signal defining the timing to add those signals together is generated by either the light source control section 11 or the arithmetic processing section, the timings when the optical powers are at those levels can be extracted from one of them.

In the example illustrated in FIG. 18, the bottom level (Pb level) of the main beam is relatively close to the sub-beam read level of the power monitor output, and therefore, the sub-beam's power monitor output is suitably sampled when the main beam is at the bottom level (Pb level). However, the bias level (Pe level) occurs more frequently. That is why if it works better for sampling, the sub-beam's power monitor output may also be sampled when the main beam is at the bias level (Pe level). Still alternatively, if the write modulated waveform has another level that is relatively close to that of a sub-beam component other than the bias level (Pe level), then sampling may also be carried out at that timing (e.g., when a cooling pulse is applied). To ensure sufficient sampling accuracy, it would be effective to turn the sampling mode ON only when emission of light at the level to make sampling lasts for at least a predetermined period of time.

By adopting this arrangement, the optical power can be controlled with multiple light sources kept ON. That is to say, the optical powers of the light sources can be controlled without suspending the DRAW operation.

Embodiment 4

FIG. 19 is a block diagram illustrating a power monitoring detector 12 and a light source control section 11 for an optical read/write apparatus as a fourth embodiment of the present disclosure.

The light beams that have been emitted from the light sources 1 and 2 are incident as superposed light on a photodiode 15 of the power monitoring detector 12. The photo current thus received is transformed into a voltage by an IV amplifier 44, which is then supplied to VV amplifiers 48 and 49 for which individual gains have been set. The output of the VV amplifier 48 is supplied to the main beam's optical power control block of the light source control section 11 and used to obtain power monitor signals at the bottom (Pb), bias (Pe) and peak (Pw) levels and to control a current driver for the light source 1. On the other hand, the output of the VV amplifier 49 is supplied to the sub-beam's optical power control block of the light source control section 11 and used to obtain a read level and control a current driver for the light source 2.

Portions (a), (b), (c) and (d) of FIG. 20 show the optical power of the main beam, the optical power of the sub-beam, the output waveform of the VV amplifier 48 and the output waveform of the VV amplifier 49, respectively. The gain of the VV amplifier 49 is set to be higher than that of the VV amplifier 48. As a result, the sub-beam read level can be detected accurately.

FIG. 21 illustrates an example in which the gains of the VV amplifiers 49 and 48 have been set so that the output of the VV amplifier 49 corresponding to the sub-beam's read level becomes approximately equal to the output of the VV amplifier 48 corresponding to the bias level. By setting the gains in this manner, the main beam's bias level and the sub-beam's read level can share the same control target value, and therefore, the number of target values to be stored in the system can be reduced. As a result, the system can be simplified. In that case, the power monitoring detector 12 may be configured to make automatic adjustment so that the sub-beam's read level control target value always agrees with the main beam's bottom level control target value by changing the settings of the gain adjusters 46 and 47 for the VV amplifiers 48 and 49 shown in FIG. 19 according to the bottom level target value that has been set. In the example illustrated in FIG. 21, the bias level and the sub-beam's read level are supposed to have the same target value. Alternatively, the bottom level and the sub-beam's read level may share the same target value as well.

Still alternatively, the photosensitive section of the power monitoring detector 12 may be split into two photodiodes 50 and 51 as shown in FIG. 22 and the two photodiodes 50 and 51 may use IV amplifiers 52 and 44, respectively, as shown in FIG. 23. In that case, the gains of the IV amplifiers can also be optimized in order to monitor the power of the sub-beam, and therefore, the sub-beam's power monitor signal can have an increased SNR. In that case, the IV amplifier 52 is expected to have a saturated peak level. That is why it is recommended that a diode clip circuit be provided to recover from the saturation as quickly as possible. The direction in which the photosensitive section is split into photodiodes and the number of those photodiodes are just an example. Thus, the photosensitive section may also be divided into any other number of areas or in any other direction.

Embodiment 5

Hereinafter, an optical read/write apparatus as a fifth embodiment of the present disclosure will be described.

FIG. 24 shows the waveforms of the respective optical powers of the main and sub-beams and the output of the power monitoring detector during a write operation. FIG. 25 is a block diagram illustrating configurations for a power monitoring detector 12 and a light source control section 11 according to this embodiment.

As shown in FIG. 24, in this example, right after a mark has been recorded (e.g., just after the second recorded mark has been formed in the example illustrated in FIG. 24), the sub-beam's read power is changed by ΔP. In response, the output of the VV amplifier 49 also changes by ΔV. According to this configuration, ΔV is detected by sampling the output of the VV amplifier 49 before and after the read power changes. And by detecting ΔV, the sub-beam's optical power component is extracted, thereby controlling the optical power of the light source 2. By adopting such a configuration, the sub-beam's power monitor information can be obtained more accurately.

In the first through fifth embodiments of the present disclosure described above, even a situation where the running direction of the optical tape 105 is reversed can be coped with by changing the roles to be played by the main and sub-beams. That is to say, in that case, the operations described above may be performed by using the light beams emitted from the light sources 1 and 2 as sub- and main beams, respectively.

Also, in the first and second embodiments, the read operations to be performed in parallel using the main and sub-beams may be carried out by turning OFF one of the two light sources 1 and 2 for the main and sub-beams as soon as the non-user data is detected and by controlling the optical power of the other light beam. In that case, just the read power level needs to be sampled for both of the main and sub-spots. That is why the main beam's power monitor information and the sub-beam's power monitor information may be obtained continuously within the same optical power control range with the sub-beam turned OFF and with the main beam turned OFF, respectively. Or even if write operations are performed in parallel using the main and sub-beams (although the DRAW operation cannot be performed in that case), the respective beams' power monitor information can also be obtained by providing a range in which writing the user data is temporarily suspended to write non-user data. In that case, since the sub-beam is also emitted with the recording power, a non-user data area may also be left in order to obtain the sub-beam's power monitor information, too.

Furthermore, in the third through fifth embodiments described above, the read operations to be performed in parallel using the main and sub-beams may be carried out just by sampling the read level for both of the main and sub-beams. That is why their optical power information may be sampled in a predetermined period. Or even a situation where write operations are performed in parallel using the main and sub-beams (although the DRAW operation cannot be performed in that case) can also be coped with by providing the sub-beam's power monitoring block with the same sampling circuit as the one for the main beam. In that case, it is beneficial to adopt a configuration in which when one of the two beams is at the bottom level or the bias level, the respective levels of the other beam are sampled. In that case, it would be effective to switch the IV and VV amplifiers by setting multiple gains for read and write modes for those amplifiers.

While the present disclosure has been described with respect to first through fifth embodiments thereof, it will be apparent to those skilled in the art that the disclosed disclosure may be modified in numerous ways and may assume many embodiments other than those specifically described above. Accordingly, it is intended by the appended claims to cover all modifications or combinations of the disclosure that fall within the true spirit and scope of the disclosure.

An optical read/write apparatus according to the present disclosure can be used effectively as an apparatus or device for controlling the optical powers of multiple light sources using a simple configuration in a DRAW system that is designed to perform a write operation and a read operation for verification in parallel using a bulk data storage system (such as a data file system that uses an optical tape or an optical disc) including such optical read/write apparatuses.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2011-219014 filed Oct. 3, 2011 and No. 2012-050138 filed Mar. 7, 2012, the entire contents of which are hereby incorporated by reference.

What is claimed is:

1. An optical read/write apparatus comprising:
a plurality of light sources including a first light source and a second light source;
an optical system which converges, onto an optical storage medium, a write beam emitted from the first light source and a read beam emitted from the second light source so that the same location on the optical storage medium is scanned with the write beam before being scanned with the read beam;
a signal detector which senses the write and read beams that have been reflected from the optical storage medium and which generates electrical signals;
a power monitoring detector which monitors the optical powers of the first and second light sources; and
a control section which controls the optical powers of the first and second light sources and which modulates the optical power of the first light source so that a signal mark is recorded on the optical storage medium with the write beam in a write mode,
wherein in an optical power control range in which writing user data on the optical storage medium is temporarily suspended, the control section writes non-user data on the optical storage medium and turns the second light source OFF while writing the non-user data, and
wherein the power monitoring detector obtains optical power information of the first light source while the second light source is OFF,
wherein a time t it takes for the write beam or the read beam to pass through the optical power control range and one period T of the optical power control operation satisfy the inequality $T/t \geq 100$.

2. The optical read/write apparatus of claim 1, wherein the non-user data includes at least one of address data and a sync signal.

3. The optical read/write apparatus of claim 1, wherein the control section leaves a data unrecorded area in the optical power control range on the optical storage medium.

4. The optical read/write apparatus of claim 1, wherein the control section writes an address data adjacently to the optical power control range on the optical storage medium.

5. The optical read/write apparatus of claim 1, wherein optical power information of the first light source and optical power information of the second light source are obtained from the same optical power control range.

6. The optical read/write apparatus of claim 1, wherein optical power information of the second light source is obtained with the first light source turned OFF.

7. The optical read/write apparatus of claim 6, wherein after the optical power information of the second light source has been obtained, the optical power information of the first light source is obtained.

8. The optical read/write apparatus of claim 1, wherein when the non-user data finishes being written with the write beam, a spot of the read beam is located on the non-user data.

9. An optical read/write apparatus comprising:
a plurality of light sources including a first light source and a second light source;
an optical system which converges, onto an optical storage medium, a write beam emitted from the first light source and a read beam emitted from the second light source so that the same location on the optical storage medium is scanned with the write beam before being scanned with the read beam;
a signal detector which senses the write and read beams that have been reflected from the optical storage medium and which generates electrical signals;
a power monitoring detector which monitors the optical powers of the first and second light sources; and
a control section which controls the optical powers of the first and second light sources and which modulates the optical power of the first light source so that a signal mark is recorded on the optical storage medium with the write beam in a write mode,
wherein the control section controls the optical powers of the first and second light sources based on a power monitor signal sampled in the output of the power monitoring detector, the timing to sample the power monitor signal being determined based on a modulation signal that is used to modulate the optical power of the first light source.

10. The optical read/write apparatus of claim 9, wherein the modulation signal has a waveform that changes between two or more levels, and wherein when the level of the modulation signal is lower than its maximum value, the power monitor signal is sampled for the second light source.

11. The optical read/write apparatus of claim 10, wherein when the modulation signal has the lowest level, the power monitor signal is sampled for the second light source.

12. The optical read/write apparatus of claim 11, wherein when the modulation signal has a level at which a mark that has been recorded on the storage medium is erased with the write beam, the power monitor signal is sampled for the second light source.

13. The optical read/write apparatus of claim 11, wherein if the modulation signal continues to have a level at which a mark that has been recorded on the storage medium is erased with the write beam for a predetermined period or more, the power monitor signal is sampled for the second light source.

14. The optical read/write apparatus of claim 9, wherein the power monitoring detector includes a line to output a power monitor signal for the first light source and another line to output a power monitor signal for the second light source.

15. The optical read/write apparatus of claim 14, comprising a first gain adjuster that adjusts the gain of the power monitor signal for the first light source and a second gain adjuster that adjusts the gain of the power monitor signal for the second light source.

16. The optical read/write apparatus of claim 15, wherein the gain of the power monitor signal for the second light source is set to be higher than the gain of the power monitor signal for the first light source.

17. The optical read/write apparatus of claim 15, wherein the gains are adjusted so that the second light source's output component, which is included in the power monitor signal for the second light source, becomes substantially equal to the value of the power monitor signal for the first light source when the power monitor signal for the second light source is sampled.

18. The optical read/write apparatus of claim 15, wherein the gain of the power monitor signal for the second light source is adjustable according to any change of the optical power of the first light source.

19. The optical read/write apparatus of claim 14, wherein the power monitoring detector includes a photodiode that has been divided into a first area to generate the power monitor signal for the first light source and a second area to generate the power monitor signal for the second light source.

20. The optical read/write apparatus of claim 19, wherein in an amplifier that transforms photo-current obtained from the second area into a voltage, light that has been incident there from the first light source has a saturated crest value.

21. The optical read/write apparatus of claim 10, wherein the power of the second light source is changed in a range where a timing signal is OFF.

* * * * *